US010506389B2

United States Patent
Futaki et al.

(10) Patent No.: US 10,506,389 B2
(45) Date of Patent: Dec. 10, 2019

(54) RADIO TERMINAL, RADIO STATION, AND METHOD THEREFOR

(71) Applicant: NEC CORPORATION, Tokyo (JP)

(72) Inventors: Hisashi Futaki, Tokyo (JP); Sadafuku Hayashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/069,777

(22) PCT Filed: Dec. 15, 2016

(86) PCT No.: PCT/JP2016/087351
§ 371 (c)(1),
(2) Date: Jul. 12, 2018

(87) PCT Pub. No.: WO2017/134939
PCT Pub. Date: Aug. 10, 2017

(65) Prior Publication Data
US 2019/0028860 A1  Jan. 24, 2019

(30) Foreign Application Priority Data
Feb. 4, 2016  (JP) .................. 2016-020291

(51) Int. Cl.
*H04W 4/14* (2009.01)
*H04W 76/20* (2018.01)
*H04W 76/27* (2018.01)

(52) U.S. Cl.
CPC .......... *H04W 4/14* (2013.01); *H04W 76/20* (2018.02); *H04W 76/27* (2018.02)

(58) Field of Classification Search
CPC ........ H04W 4/14; H04W 76/20; H04W 76/27
(Continued)

(56) References Cited

U.S. PATENT DOCUMENTS 8,768,305 B1 * 7/2014 Singh .................... H04W 76/19
455/411
2010/0184438 A1 * 7/2010 Wu .................. H04W 36/0055
455/436

(Continued)

FOREIGN PATENT DOCUMENTS

WO  2015/142048 A1  9/2015

OTHER PUBLICATIONS

"3rd Generation Partnership Project; Technical Specification Group Services and System Aspects; Architecture enhancements for Cellular Internet of things (Release 13)"; 3GPP TR 23.720; Nov. 2015; pp. 1-96; v1.2.0; France.

(Continued)

*Primary Examiner* — Mong-Thuy T Tran
(74) *Attorney, Agent, or Firm* — Sughrue Mion, PLLC

(57) ABSTRACT

A radio terminal (1) is configured to transmit data using a first communication architecture type, in response to an occurrence of a request for specific data transmission when the radio terminal (1) has already been configured by a network (3) to use a second communication architecture type. This contributes to, for example, when the radio terminal has already been configured by the network to use the second communication architecture type that involves suspension and resumption of an RRC connection, facilitating effectively performing communication according to the first communication architecture type that involves data transmission over a control plane.

17 Claims, 12 Drawing Sheets

(58) Field of Classification Search
USPC .......................................................... 455/466
See application file for complete search history.

(56) References Cited

U.S. PATENT DOCUMENTS

| | | | | |
|---|---|---|---|---|
| 2013/0039287 | A1* | 2/2013 | Rayavarapu | H04W 68/005 |
| | | | | 370/329 |
| 2013/0260810 | A1* | 10/2013 | Rayavarapu | H04W 76/19 |
| | | | | 455/509 |
| 2016/0212638 | A1* | 7/2016 | Jain | H04W 4/70 |
| 2016/0234877 | A1* | 8/2016 | Bangolae | H04W 4/70 |
| 2016/0278160 | A1* | 9/2016 | Schliwa-Bertling | |
| | | | | H04W 48/02 |
| 2018/0035420 | A1* | 2/2018 | Centonza | H04W 72/048 |
| 2018/0376531 | A1* | 12/2018 | Martinez Tarradell | |
| | | | | H04W 76/27 |
| 2019/0021023 | A1* | 1/2019 | Byun | H04W 4/70 |
| 2019/0021134 | A1* | 1/2019 | Zhang | H04W 76/27 |
| 2019/0045482 | A1* | 2/2019 | Lee | H04W 76/28 |

OTHER PUBLICATIONS

"NB-IoT SA2 architecture implications"; Qualcomm Incorporated; Nov. 16-20, 2015; 3 pages; Anaheim, USA.

"NB-IOT-RRC Procedures"; Media Tek Inc.; Jan. 19-21, 2016; pp. 1-3; Budapest, Hungary.

"Introduction of attach procedure changes for CIoT EPS optimization"; Alcatel-lucent , 3GPP TSG SA WG2 Meeting #113; Vodafone, Qualcomm; Nokia Networks SA2; Jan. 25-29, 2016; pp. 1-16; St. Kitts.

International Search Report of PCT/JP2016/087351 dated Mar. 7, 2017.

Communication dated Jun. 11,2019, from the Japanese Patent Office in counterpart application No. 2017-565424.

NEC, "Establishment cause value in Solution 2 and 18", 3GPP TSG RAN2 NB-IOT Ad-hoc Meeting, Budapest, Hungary, R2-160511, Jan. 19-21, 2016 (4 pages total).

Communication dated Jul. 1, 2019, issued by the Korean Intellectual Property Office in corresponding Korean Application No. 10-2018-7022298.

CATT, "Interactions between solution 2 and 18", 3GPP TSG-RAN WG2 #NB-IOT, R2-160454, Budapest, Hungary, Jan. 19-21, 2016, pp. 1-2 (2 pages total).

LG Electronics, "Interaction between CP & UP solution", 3GPP, SA WG2 Meeting S2#112, S2-153925, Nov. 16-20, 2015, pp. 1-3.

Communication dated Aug. 28, 2019 from European Patent Office in counterpart EP Application No. 16889422.8.

* cited by examiner

RADIO TERMINAL, RADIO STATION, AND METHOD THEREFOR

This application is a National Stage of International Application No. PCT/JP2016/087351 filed Dec. 15, 2016, claiming priority based on Japanese Patent Application No. 2016-020291 filed Feb. 4, 2016, the entire contents of which are hereby incorporated by reference.

TECHNICAL FIELD

The present disclosure relates to a radio communication system supporting a plurality of communication architecture types for data transmission.

BACKGROUND ART

The 3rd Generation Partnership Project (3GPP) has been standardizing Cellular Internet of Things (CIoT). CIoT covered by 3GPP includes Long Term Evolution enhanced Machine to Machine (LTE eMTC) and Narrowband IoT (NB-IoT). The characteristic features of LTE eMTC and NB-IoT include ultra-low User Equipment (UE) power consumption, a large number of devices per cell, narrowband spectrum, and extended coverage. In LTE eMTC (Category M), UE Radio Frequency (RF) bandwidth is defined as 1.4 MHz. Meanwhile, in NB-IoT, it is assumed that downlink and uplink peak rates are 200 kbps or 144 kbps, and UE RF bandwidth is about 200 kHz (effective bandwidth is 180 kHz) in both uplink and downlink for further cost optimization, low power consumption, and coverage extension.

Non Patent Literature 1 describes several communication architecture solutions for infrequent small data transmission in the NB-IoT. These solutions include an architecture for data transmission through the control plane (i.e., Solution 2) and an architecture for data transmission through the user plane (i.e., Solution 18) involving suspension and resumption of an RRC connection. In Non Patent Literature 1, support of the solution 2 is mandatory for both the UE and the network, while support of the solution 18 is optional for both the UE and the network.

The solution 2 is based on the lightweight Core Network (CN) architecture for CIoT. In the lightweight CN architecture, in consideration of typical use cases of CIoT devices, the core network only supports a limited number of functions, compared to the CN entities in the existing LTE (i.e., Mobility Management Entity (MME), Serving Gateway (S-GW), and Packet Data Network Gateway (P-GW)). FIG. 1 shows a network architecture for CIoT in a non-roaming case.

CIoT Serving Gateway Node (C-SGN) is a new logical network entity. The C-SGN is a CN node having both the control plane (CP) and the user plane (UP). The C-SGN provides a limited Mobility Management (MM) procedure for CIoT devices, a small data transmission procedure, a security procedure for small data transmission, and a termination of an SGi interface for the non-roaming case. The P-GW function may be separated from the C-SGN. In this case, an S5 interface is used between the C-SGN and the P-GW. In a roaming case, the C-SGN provides an S8 interface.

The S1-lite interface is an optimized version of S1-C(S1-MME). The S1-lite interface supports S1 Application Protocol (S1AP) messages and information elements (IEs) for CIoT procedures, and also supports optimized security procedures. For efficient small data transmission, user data is delivered through the SLAP layer.

Specifically, in the Mobile Originated (MO) small data transmission for the non-roaming case, the UE transmits an uplink Non-Access Stratum (NAS) message carrying a small data packet (e.g., Internet Protocol (IP), non-IP, short message service (SMS)). This uplink NAS message is delivered to the C-SGN via the CIoT Base Station (CIoT BS). This uplink NAS message is transmitted on a Signaling Radio Bearer (SRB). Thus, a setup of a Data Radio Bearer (DRB) is not required. Further, Access Stratum (AS) Security may be omitted.

The C-SGN decrypts the uplink NAS message to obtain the small data packet. The C-SGN forwards the small data packet according to the data type of the small data packet. For IP small data, the C-SGN sends it on the SGi interface. For SMS, the C-SGN sends it to an entity related to SMS (e.g., SMS Gateway Mobile Services Switching Center (SMS-GMSC), SMS Interworking Mobile Services Switching Center (SMS-IWMSC), SMS router). For Non-IP small data, the C-SGN sends it to the Service Capability Exposure Function (SCEF).

In the Mobile Terminated (MT) small data transmission for the non-roaming case, the C-SGN transmits a downlink NAS message carrying a small data packet to the UE through the CIoT BS. Also for the small data packet transmission in downlink, a DRB is not required and AS security may be omitted.

The CIoT BS shown in FIG. 1 is a base station in the CIoT Radio Access Network (CIoT RAN). An LTE eNB configured to be connected to the C-SGN may be used instead of the CIoT BS in FIG. 1. This LTE eNB may be an eNB that supports LTE eMTC.

Meanwhile, the architecture according to the solution 18 provides infrequent small data transmission on the user plane. The architecture according to the solution 18 has the feature of reusing information obtained from the previous RRC connection for the subsequent RRC connection setup, thereby reducing the signaling required for UE Radio Resource Control (RRC) state transition.

Specifically, a UE enters the RRC-Idle mode from the RRC-Connected mode and retains information about the RRC connection (e.g., an Access Stratum Security Context, bearer related information (incl. RoHC state information), and L2/1 parameters when applicable) while it is in RRC-Idle mode. Similarly, an eNB retains information about the RRC connection of the UE (e.g., Access Stratum Security Context, bearer-related information (incl. RoHC state information), and L2/1 parameters when applicable). Further, the eNB and MME retain S1AP UE Contexts. Furthermore, the eNB retains S1-U tunnel addresses.

When returning to the RRC-Connected mode, the UE sends an RRC Connection Resume Request to the eNB. The eNB restores a DRB(s), a security context, an S1AP connection, and an S1-U tunnel(s) based on the previously retained information about the RRC connection. Further, the eNB informs the MME of a UE state change using a new S1AP message (e.g., S1AP: UE Context Resume Request). The MME returns the Evolved Packet System (EPS) Connection Management (ECM) state of the UE to the ECM-Connected state and then sends a Modify Bearer Request message to the S-GW. As a result, the S-GW recognizes that the UE is in the connected state and hence becomes ready to transmit downlink data towards the UE.

In the solution 18, the UE can return to RRC-Connected and ECM-Connected without transmitting a NAS message (i.e., Service Request). Further, as compared with the legacy RRC connection setup procedure, the following RRC messages can be removed:

RRC Connection Setup Complete;
RRC Security Mode Command;
RRC Security Mode Complete;
RRC Connection Reconfiguration; and
RRC Connection Reconfiguration Complete.

The above-described solution 2 and solution 18 are also referred to as "Data over NAS (DoNAS)" and "AS context caching", respectively. Alternatively, the solution 2 and solution 18 are also referred to as "Control Plane CIoT EPS optimisation" and "User Plane CIoT EPS optimisation", respectively.

At this time, it is assumed that the solution 2 does not use Access Stratum (AS) security and PDCP, and neither the solution 2 nor the solution 18 uses the SRB 2.

In some implementations, the solution to be applied to the UE may be selected by the core network (i.e., MME, C-SGN) in the attach procedure for this UE. Alternatively, in some implementations, the UE itself may select the solution. The core network or the UE makes an initial selection of the solution to be applied to the UE, and after that the core network or the UE changes the selected solution.

Non Patent Literature 2 describes that the UE may determine, during the attach procedure, which of the Solution 2 architecture and the Solution 18 architecture it would prefer to use. Further, Non Patent Literature 2 describes that an AS procedure or a NAS procedure may include information for allowing the network to select the solution 2 or the solution 18 for data transmission.

Non Patent Literature 3 describes that the UE may include a "Preferred Network Behaviour" indication in a NAS message such as an Attach Request, a PDN Connection Request, and a Tracking Area Update (TAU) Request. The Preferred Network Behaviour indicates a solution that the UE can support or that the UE would prefer to use. Specifically, the Preferred Network Behaviour may include the following information:

Whether Control Plane CIoT EPS optimisation is supported;
Whether User Plane CIoT EPS optimisation is supported;
Whether Control Plane CIoT EPS optimisation is preferred or whether User Plane CIoT EPS optimisation is preferred;
Whether S1-U data transfer is supported;
Whether SMS transfer without Combined Attach is requested; and
Whether Attach without PDN Connectivity is supported.

CITATION LIST

Non Patent Literature

Non Patent Literature 1: 3GPP TR 23.720 V1.2.0 (2015-11), "3rd Generation Partnership Project; Technical Specification Group Services and System Aspects; Architecture enhancements for Cellular Internet of Things (Release 13)", November 2015
Non Patent Literature 2: 3GPP R2-156645, Qualcomm Incorporated, "NB-IoT SA2 architecture implications", 3GPP TSG RAN WG2 #92, Anaheim, USA, 16-20 Nov. 2015
Non Patent Literature 3: 3GPP S2-160448, Alcatel-lucent, Vodafone, Qualcomm, Nokia Networks, "Introduction of attach procedure changes for CIoT EPS optimization", 3GPP TSG SA WG2 Meeting #113, St. Kitts, Jan. 25-29, 2016

SUMMARY OF INVENTION

Technical Problem

The inventors have studied communication architectures for CIoT and communication architectures for reducing power consumption of a radio terminal (UE), and found several problems including three problems described below in detail.

Firstly, according to the teachings of the above-mentioned Non Patent Literature 1 to 3, it is not clear what sort of event could cause the UE to perform the communication of the solution 2 (i.e., data transmission over the control plane (NAS)) when the UE has already been configured by the network (e.g., MME, C-SGN) to use the solution 18.

Secondly, according to the teaching of the above-mentioned Non Patent Literature 1 to 3, it is not clear how the information (context) about the RRC connection retained in the UE is handled when the UE is requested by a higher layer to transmit data in accordance with the solution 2 (i.e., data transmission over NAS) while suspending the RRC connection for the solution 18 (i.e., communication involving suspension and resumption of the RRC connection). The higher layer is, for example, a service/application layer, an IP Multimedia Subsystem (IMS) layer, or a NAS layer.

Thirdly, according to the teachings of the above-mentioned Non Patent Literature 1 to 3, it is not clear which type of RRC message is used to transmit data in accordance with the solution 2 (i.e., data transmission over the control plane (NAS)) when the UE is requested by the higher layer to transmit data in accordance with the solution 2 while suspending the RRC connection for the solution 18. For example, assume that an RRC connection resume message used for resuming the RRC connection is also used for the data transmission in accordance with the solution 2. In this case, the eNB receives this RRC connection resume message, but it might fail to recognize that this RRC connection resume message contains a NAS message carrying data.

In light of the above problems, one of the objects to be attained by embodiments disclosed herein is to provide an apparatus, a method, and a program that, when a radio terminal has already been configured by a network (e.g., MME, C-SGN) to use a communication architecture type involving suspension and resumption of an RRC connection, facilitate effectively performing communication according to another communication architecture type involving data transmission on a control plane (NAS).

It should be noted that this object is only one of the objects to be attained by the embodiments disclosed herein. Other objects or problems and novel features will become apparent from the following description and accompanying drawings.

Solution to Problem

In a first aspect, a radio terminal includes a memory and at least one processor coupled to the memory. The at least one processor is configured to support a plurality of communication architecture types. The plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection. The suspension of the RRC connection includes retaining in the radio terminal a context of a previous RRC connection while the radio terminal is in an RRC idle state. The resumption of the RRC connection includes reusing the retained context at the time of a setup of a subsequent RRC connection in order for the radio terminal to transition from the RRC idle state to an RRC connected state. The at least one processor is further configured to, in response to an occurrence of a request for specific data transmission when the radio terminal has already been configured by a network to use the second communication architecture type, transmit data using the first communication architecture type.

In a second aspect, a method in a radio terminal includes being configured by a network with at least one of a plurality of communication architecture types. The plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection. The suspension of the RRC connection includes retaining in the radio terminal a context of a previous RRC connection while the radio terminal is in an RRC idle state. The resumption of the RRC connection includes reusing the retained context at the time of a setup of a subsequent RRC connection in order for the radio terminal to transition from the RRC idle state to an RRC connected state. The method further includes, in response to an occurrence of a request for specific data transmission when the radio terminal has already been configured by the network to use the second communication architecture type, transmitting data using the first communication architecture type.

A third example aspect is a program including instructions (software codes) that, when loaded into a computer, causes the computer to perform a method according to the above second example aspect.

Advantageous Effects of Invention

The above example aspects can provide an apparatus, a method, and a program that, when a radio terminal has already been configured by a network (e.g., MME, C-SGN) to use a communication architecture type involving suspension and resumption of an RRC connection, facilitate effectively performing communication according to another communication architecture type involving data transmission on a control plane (NAS).

DESCRIPTION OF EMBODIMENTS

Hereinafter, specific embodiments will be described in detail with reference to the drawings. The same or corresponding elements are denoted by the same signs throughout the drawings, and repeated descriptions will be omitted as necessary for the sake of clarity.

Each of the embodiments described below may be used individually, or two or more of the embodiments may be appropriately combined with one another. These embodiments have novel features different from each other. Accordingly, these embodiments contribute to attaining objects or solving problems different from each other and to achieving advantages different from each other.

The following descriptions on the embodiments mainly focus on radio communication networks for CIoT terminals including LTE eMTC and NB-IoT. However, these embodiments may be applied to communication of other UEs in LTE, LTE-Advanced, and modified versions thereof. That is, these embodiments may be applied to radio networks for communication of other UEs related to LTE, LTE-Advanced, and modified versions thereof. Furthermore, these embodiments are not limited to LTE, LTE-Advanced, and modified versions thereof, and may be applied to other radio communication networks.

First Embodiment

Figure 1:
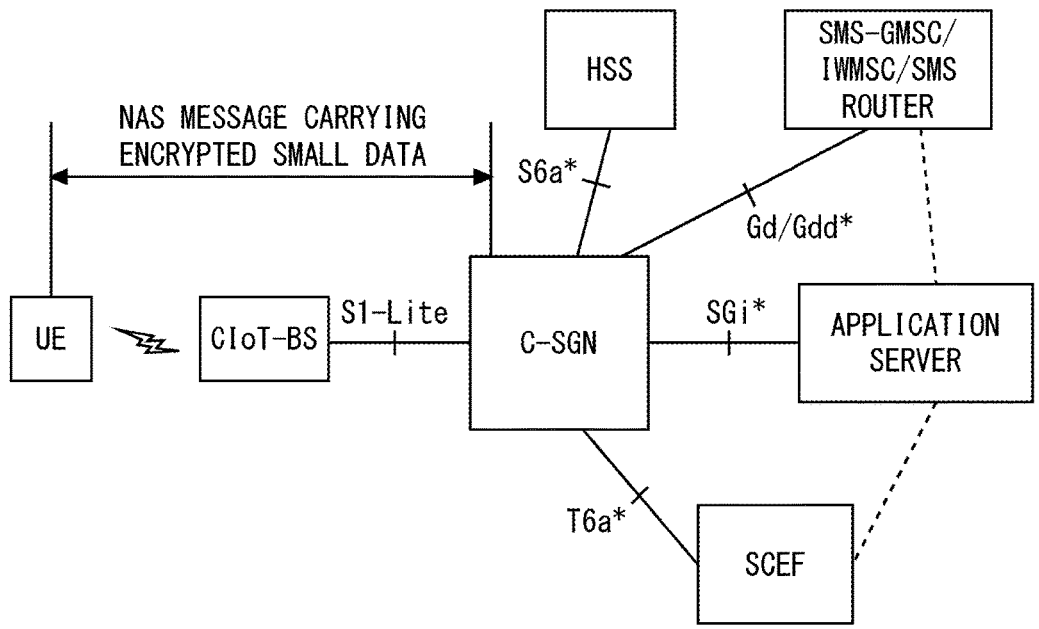
FIG. 1 is a view showing an example of a CIoT architecture.
Figure 2:
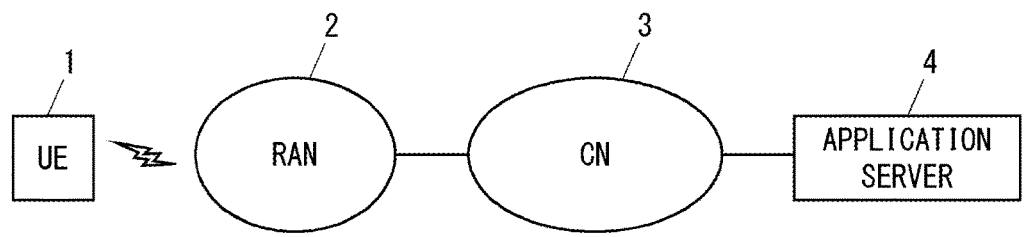
FIG. 2 is a view showing a configuration example of a radio communication network according to some embodiments.

FIG. 2 shows a configuration example of a radio communication network according to some embodiments including this embodiment. In the example shown in FIG. 2, a UE 1 which functions as a CIoT device communicates with an application server 4 through a CIoT Radio Access Network (RAN) 2 and a Core Network (CN) 3. The RAN 2 supports a plurality of communication architecture types for data packet transmission regarding CIoT. The RAN 2 broadcasts in a cell, by using for example a Master Information Block (MIB) or a System Information Block (SIB), information that explicitly or implicitly indicates the plurality of communication architecture types supported by the RAN 2. The UE 1 supports these communication architecture types. The CN 3 supports these communication architecture types. The CN 3 may include dedicated CNs (DCNs) each associated with a different one of the communication architecture types.

The UE 1 may support either one or both of LTE eMTC and NB-IoT. In other words, the UE 1 may support either one or both of the CIoT RAT (NB-IoT RAT) and the LTE RAT (eMTC). The RAN 2 may include either one or both of a CIoT BS supporting the CIoT RAT (NB-IoT RAT) and an eNB supporting the LTE RAT (eMTC). The CN 3 may include a C-SGN, or an MME and an S-GW, or both. The CN 3 may further include other network entities such as a P-GW, a Home Subscriber Server (HSS), a Service Capability Exposure Function (SCEF), and a Policy and Charging Rules Function (PCRF).

In some implementations, the plurality of communication architecture types may include first and second communication architecture types corresponding respectively to the solutions 2 and 18, which are disclosed in Non Patent Literature 1. The first communication architecture type can be referred to as "Data over NAS (DoNAS)" or "Control Plane CIoT EPS optimisation". That is, in the first communication architecture type, user data packets transmitted or received by the UE 1 are transferred through the control plane (e.g., NAS messages transmitted between the UE and the MME/C-SGN). In the first communication architecture type, the RAN 2 does not need to set up a DRB for data packet transmission for the UE 1. Further, regarding the SRB used for data packet transmission, Access Stratum (AS) security (i.e., ciphering and deciphering of control plane data and integrity protection and integrity verification of control plane data) by the RAN 2 may be omitted. In other words, the processing of a Packet Data Convergence Protocol (PDCP) layer for the SRB used for data packet transmission may be omitted. In this case, data packets of the UE 1 is encrypted and decrypted by the UE 1 and CN 3 (e.g., MME, C-SGN) by using NAS security keys.

In contrast to this, the second communication architecture type can be referred to as "AS context caching" or "User Plane CIoT EPS optimisation". That is, in the second communication architecture type, user data packets transmitted or received by the UE 1 are transferred through the user plane (e.g., an EPS bearer including a DRB and a General Packet Radio Service (GPRS) tunneling protocol (GTP) tunnel), and it involves suspension and resumption of an RRC connection.

The suspension of an RRC connection includes retaining, in the UE 1 and RAN 2 (e.g., eNB, CIoT-BS), information (or a context) of a previous RRC connection while the UE 1 is in an RRC idle state (specifically, a new RRC state for CIoT (e.g., CIoT RRC-Idle state)). As already described, the context retained in the UE 1 and the RAN 2 includes, for example, an Access Stratum Security Context, bearer-related information (incl. RoHC state information), and L2/1 parameters when applicable. The RAN 2 may instruct the UE 1 to suspend an RRC connection using an RRC message (e.g., RRC Connection Release). Further, the RAN 2 may transmit terminal identification information (e.g., Resume ID) used for resuming the RRC connection, using this RRC message.

Further, the suspension of an RRC connection includes retaining, in the RAN 2 (e.g., eNB, CIoT-BS) and the CN 3 (e.g., MME, C-SGN), a signaling association regarding the UE 1 between the RAN 2 and the CN 3 while the UE 1 is in the RRC idle state (and also in the ECM-IDLE state). This signaling association regarding the UE 1 is an S1AP association. The RAN 2 and the CN 3 retain this S1AP association and UE Contexts (e.g., eNB UE S1AP ID and MME UE S1AP ID) associated therewith. Furthermore, the suspension of an RRC connection includes retaining, in the RAN 2 (e.g., eNB, CIoT-BS) and the CN 3 (e.g., S-GW), a bearer context regarding a data bearer between the RAN 2 and the CN 3 while the UE 1 is in the RRC idle state (and also in the ECM-IDLE state). This data bearer is an S1-U bearer, and this bearer context includes S1-U tunnel addresses (i.e., an S1 eNB tunnel endpoint identifier (TEID) and an S1 S-GW TEID).

The resumption of an RRC connection includes reusing the retained RRC connection context by the UE 1 and the RAN 2 (e.g., eNB, CIoT-BS) for a subsequent RRC connection setup in order for the UE 1 to transition from the RRC idle state to the RRC connected state. Furthermore, the resumption of an RRC connection includes reusing or restoring the retained S1AP signaling association and the bearer context along with a subsequent RRC connection setup for the UE 1 to transition from the RRC idle state to the RRC connected state.

More specifically, when the UE 1 returns to the RRC-Connected mode, the UE 1 transmits an RRC Connection Resume Request to the RAN 2 (e.g., eNB). The RAN 2 restores a DRB(s), a security context, an S1AP connection, and an S1-U tunnel(s) based on the retained context. Further, the RAN 2 informs the CN 3 of a UE state change using a new S1AP message (e.g., S1AP: UE Context Resume Request). A control plane node (e.g., MME) in the CN 3 returns the ECM state of the UE 1 to the ECM-Connected state and transmits a Modify Bearer Request message to a user plane node (e.g., S-GW). As a result, the user plane node recognizes that the UE 1 is in the connected state and hence becomes ready to transmit downlink data towards the UE 1. Note that, the RRC message transmitted by the UE 1 for resuming the RRC connection may be an RRC Connection Resume Request. Alternatively, an RRC Connection Request or an RRC Connection Reestablishment Request defined in LTE may be reused for the RRC connection resume procedure. In the latter case, a new information element (IE) indicating a request for resumption of an RRC connection may be defined, and an RRC Connection Request or an RRC Connection Reestablishment Request may include this IE to indicate that it is an RRC Connection Resume Request.

In this embodiment, the UE 1 is adapted to be configured by the network to use both the first and second communication architecture types.

Figure 3:
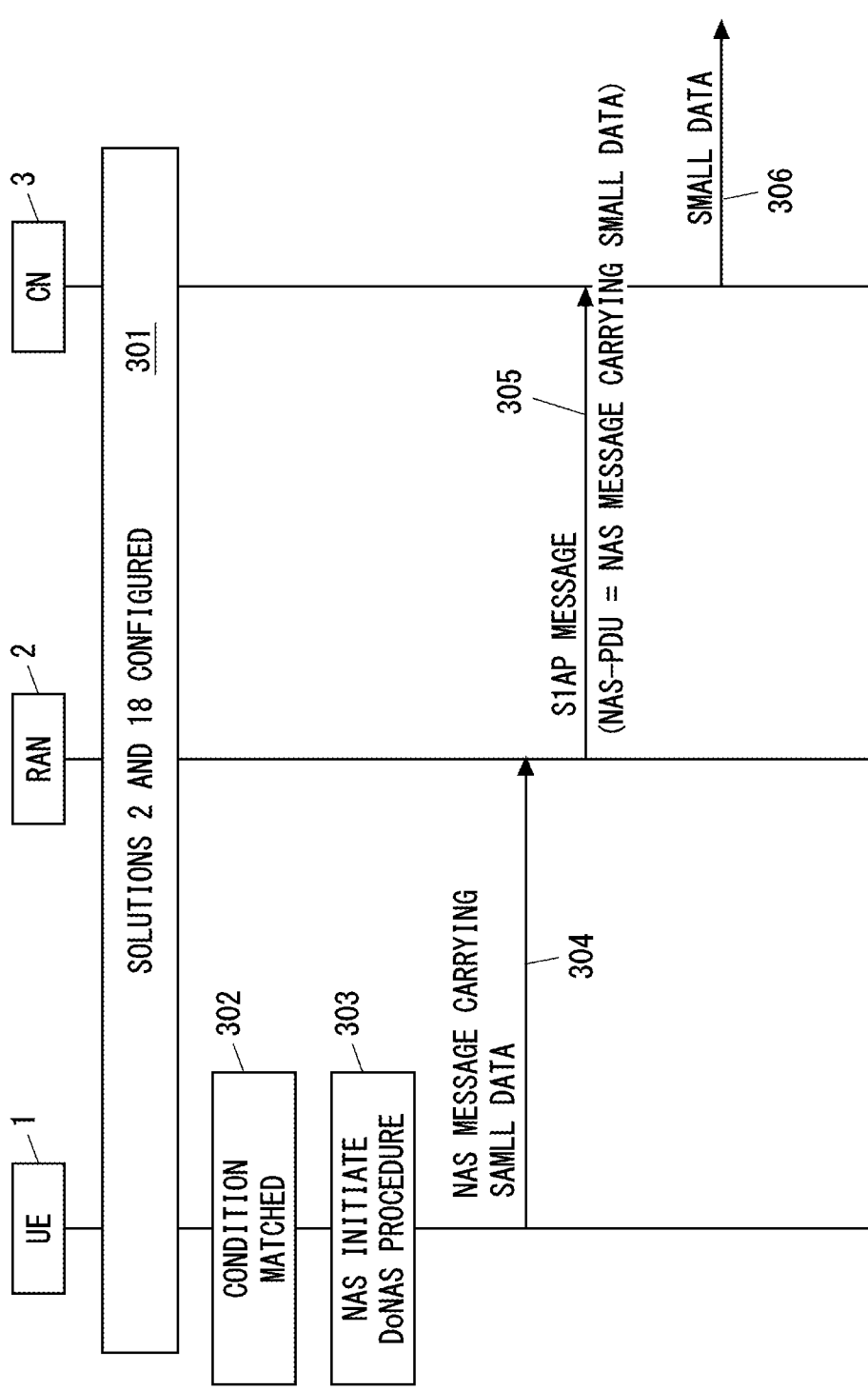
FIG. 3 is a sequence diagram showing an example of a communication procedure according to a first embodiment.

FIG. 3 is a sequence diagram showing an example of a communication procedure according to this embodiment. In the procedure of FIG. 3, in Step 301, the UE 1 is configured by the CN 3 (e.g., MME, C-SGN) to use both the first communication architecture type (i.e., Solution 2) and the second communication architecture type (i.e., Solution 18). For example, the UE 1 may include "Preferred Network Behaviour" in a NAS message such as an Attach Request, a PDN Connection Request, and a Tracking Area Update (TAU) Request. The Preferred Network Behaviour informs the CN 3 (e.g., MME) about which of the first and second communication architecture types the UE 1 would prefer to use (or which of the first and second communication architecture types the UE 1 supports). In consideration of "Preferred Network Behaviour", the CN 3 may determine the communication architecture type to be used (or allowed or configured) for the UE 1 and may inform the UE 1 of one or more determined communication architecture types using a NAS message (e.g., Attach Accept, TAU Accept).

In Step 302, the UE 1 determines whether a specific (or pre-configured) criterion is met. In other words, in Step 302, the UE 1 detects (or determines) an occurrence of a request for specific data transmission. The pre-configured criterion or the request for specific data transmission triggers the UE 1 to transmit data in accordance with the first communication architecture type (i.e., data transmission over NAS). In one example, the request for specific data transmission is a request from a higher layer (e.g., service/application layer, IMS layer, NAS layer) to a lower layer (e.g., NAS layer, AS layer) (e.g., in the case of Mobile Originated (MO) Access). Alternatively, the request for specific data transmission may be a request from a lower layer (e.g., AS layer) to a higher layer (e.g., NAS layer) (e.g., in the case of paging (Mobile Terminated (MT) Access). For example, the NAS layer of the UE 1 may determine whether the request for specific data transmission has been received from the higher layer (e.g., service/application layer, IMS layer) or the AS layer. Alternatively, the AS layer of the UE 1 may determine whether the request for specific data transmission has been received from the NAS layer.

In response to the occurrence of a request for specific data transmission when the UE 1 has already been configured by the CN 3 to use the first and second communication architecture types, the UE 1 transmits data using the first communication architecture type. Specifically, in Step 303, the NAS layer of the UE 1 initiates a DoNAS procedure for transmitting data on the NAS layer. In Step 304, the UE 1 generates a NAS message carrying small data and transmits an RRC message (e.g., RRC Connection Setup Complete, RRC Connection Resume Request, RRC Connection Resume Complete) containing this NAS message to the RAN 2 (e.g., CIoT-BS, eNB).

In Step 305, the RAN 2 receives the RRC message and sends the NAS message retrieved from the RRC message to the CN 3 using an S1AP message (e.g., Initial UE Message, UE Context Resume Request) (e.g., C-SGN, MME). The NAS message is embedded into an NAS-Protocol Data Unit (PDU) information element (IE) of this S1AP message. The RAN 2 may select, from DCNs in the CN 3, a DCN corresponding to the first communication architecture type and send the S1AP message to the selected DCN.

In Step 306, the CN 3 (e.g., C-SGN, MME) decrypts the uplink NAS message sent from the UE 1 to obtain the small data. The CN 3 forwards the small data to another node, entity, or network according to the data type of the small data.

In the example of FIG. 3, the specific data transmission may be a specific type of small data transmission. For example, the specific data transmission may be non-IP data transmission, SMS data transmission, (IP) data transmission of only one packet, or data transmission related to a predetermined service. It may be preferable for these types of data to be transferred over the control plane, rather than the user plane, because the amount thereof is small or it is not IP data.

According to the example of FIG. 3, when the UE 1 has already been configured by the CN 3 to use the second communication architecture type, the UE 1 can use the first communication architecture type for the transmission of specific types of data that are well suited to the transmission over the control plane. Thus, the UE 1 can effectively perform communication of the first communication architecture type when the UE 1 has already been configured by the CN 3 to use the second communication architecture type.

Specifically, when the UE 1 has been configured by the CN 3 to use both the first and second communication architecture types, the UE 1 determines which of the first and second communication architecture types is to be used, depending on whether the requested communication is the specific data transmission. This allows the UE 1 to properly perform the selection of the communication architecture type to be used when the UE 1 has been configured with two or more communication architecture types.

Second Embodiment

In this embodiment, a configuration example of a radio communication network is similar to that in FIG. 2. The UE 1 according to this embodiment may be a CIoT device (e.g., NB-IoT, LTE eMTC), or may be another UE in LTE, LTE-Advanced, or modified versions thereof.

Figure 4:
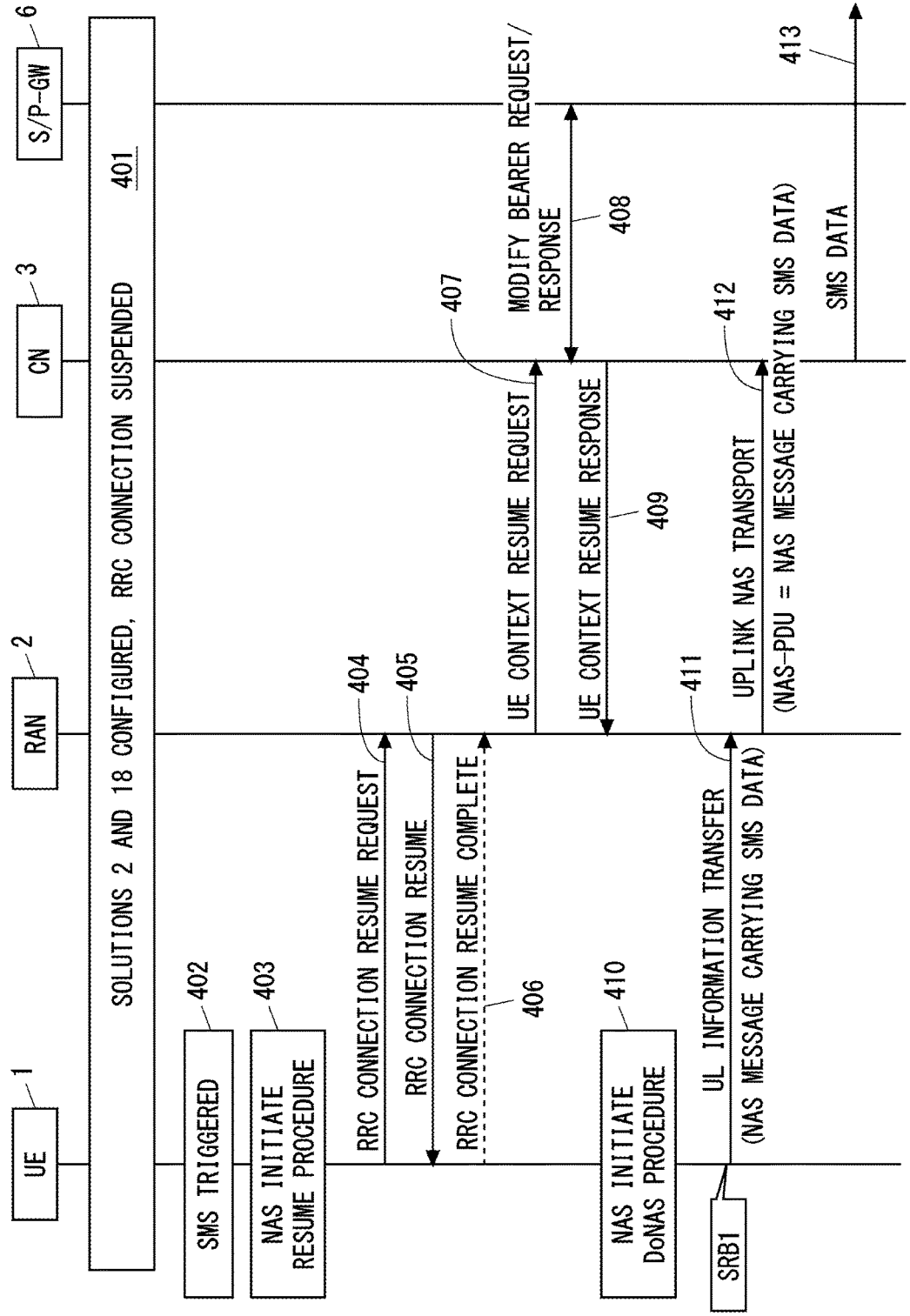
FIG. 4 is a sequence diagram showing an example of a communication procedure according to a second embodiment.

FIG. 4 is a sequence diagram showing an example of a communication procedure according to this embodiment. Similarly to the procedure of FIG. 3, in the procedure of FIG. 4, in Step 401, the UE 1 is configured by the CN 3 (e.g., MME, C-SGN) to use both the first communication architecture type (i.e., Solution 2) and the second communication architecture type (i.e., Solution 18). Further, in Step 401, the UE 1 executes a suspension operation for the second communication architecture type. That is, the UE 1 retains a context regarding a previous RRC connection while the UE 1 is in the RRC idle state (e.g., CIoT RRC idle state).

In Step 402, data transmission in accordance with the first communication architecture type is triggered. That is, the UE 1 detects (or determines) an occurrence of a request for data transmission in accordance with the first communication architecture type while the UE 1 is executing the suspension operation for the second communication architecture type. As described in the first embodiment, the request for data transmission is sent from a higher layer (e.g., service/application layer, IMS layer, NAS layer) to a lower layer (e.g., NAS layer, AS layer), or sent from a lower layer (e.g., AS layer) to a higher layer (e.g., NAS layer). In the example of FIG. 4, the UE 1 is triggered for SMS transmission. Note that the SMS transmission is merely an example of transmission suitable for the first communication architecture type. As described in the first embodiment, in Step 402, the UE 1 may be triggered for non-IP data transmission, (IP) data transmission of only one packet, or data transmission related to a predetermined service.

In Step 403, in response to the occurrence of a request for data transmission in accordance with the first communication architecture type (e.g., SMS transmission) while the UE 1 is executing the suspension operation for the second communication architecture type, the UE 1 initiates communication in accordance with the first communication architecture type (i.e., data transmission over NAS) while retaining the previous RRC connection context. In the specific example shown in FIG. 4, the NAS layer of the UE 1 performs an RRC Connection Resume procedure for resuming an RRC connection (Steps 404 to 406).

In Steps 404 to 406, the RRC connection is resumed. Specifically, in Step 404, the UE 1 transmits an RRC Connection Resume Request message to the RAN 2 (e.g., eNB, CIoT-BS). The RRC Connection Resume Request message contains a resume ID. This resume ID is, for example, a combination of a Cell-Radio Network Temporary Identifier (C-RNTI) and a Cell ID (e.g., Physical Cell ID (PCI)). In FIG. 4, a representation of the random access procedure is omitted. The RRC Connection Resume Request message of Step 404 may be transmitted in the third message (Msg 3) of the random access procedure.

The RAN 2 receives the RRC Connection Resume Request message, obtains the resume ID from the RRC Connection Resume Request message, and resumes the RRC connection based on the retained context associated with this resume ID. In Step 405, the RAN 2 transmits an RRC Connection Resume message to the UE 1. This RRC Connection Resume message indicates, for example, which DRB(s) is resumed. This RRC Connection Resume message may include L2/L1 parameters. The UE 1 resumes the retained AS security context according to the RRC Connection Resume message of Step 405. In Step 406, the UE 1 transmits an RRC Connection Resume Complete message to the RAN 2.

The RRC connection resume procedure shown in Steps 404 to 406 is merely an example. For example, although Steps 404 to 406 show a resume procedure including three steps (or three messages), the RRC connection resume procedure may be performed by two steps (two messages). In this case, the transmission from the UE 1 to the RAN 2 in Step 406 may be omitted. Further, the message from the RAN 2 to the UE 1 in Step 405 may be referred to as a RRC Connection Resume Complete message. Further, the RRC Connection Resume Request, RRC Connection Resume, and RRC Connection Resume Complete in the RRC connection resume procedure shown in the Steps 404 to 406 may be replaced with an RRC Connection Request (or RRC Connection Reestablishment Request), an RRC Connection Setup (or RRC Connection Reestablishment), and an RRC Connection Setup Complete (or RRC Connection Reestablishment Complete), respectively.

In Steps 407 to 409, the S1AP association and the S1-U bearer(s) for the UE 1 are resumed. In Step 407, the RAN 2 informs the CN 3 (e.g., MME, C-SGN) about a state change of the UE 1 using a new S1AP message (e.g., S1AP: UE Context Resume Request). The CN 3 returns the ECM state of the UE 1 to the ECM-Connected state and transmits a Modify Bearer Request message to the S/P-GW 6 (Step 408). The S/P-GW 6 then recognizes that the UE 1 is in the connected state and becomes ready to transmit downlink data towards the UE 1. In Step 409, the CN 3 sends, to the RAN 2, a response message (e.g., S1AP: UE Context Resume Response) indicating the completion of the resumption of the S1AP association and S1-U bearer(s) for the UE 1.

In Step 410, the NAS layer of the UE 1 initiates a DoNAS procedure for transmitting data on the NAS layer. In Step 411, the UE 1 generates a NAS message carrying small data (e.g., SMS data) and transmits an RRC message (e.g., UL Information Transfer) containing this NAS message to the RAN 2 (e.g., eNB, CIoT-BS). As already described, at the present time, it is assumed that neither the solution 2 nor the solution 18 will use SRB 2. Thus, the RRC message of Step 411 may be transmitted using SRB 1 on a Dedicated Control Channel (DCCH).

In Step 412, the RAN 2 receives the RRC message and sends the NAS message retrieved from the RRC message to the CN 3 (e.g., C-SGN, MME) using an S1AP message (e.g., Uplink NAS Transport). The NAS message is embedded into a NAS-Protocol Data Unit (PDU) information element (IE) of the S1AP message. The RAN 2 may select, from DCNs in the CN 3, a DCN corresponding to the first communication architecture type and send the S1AP message to the selected DCN.

In Step 413, the CN 3 (e.g., MME, C-SGN) decrypts the uplink NAS message sent from the UE 1 to obtain the small data. The CN 3 forwards the small data packet to another node, entity, or network, according to the data type of the small data. In the example of FIG. 4, the CN 3 sends the obtained SMS data to an entity related to SMS (e.g., SMS-GMSC, SMS-IWMSC, SMS router).

As can be understood from the above description, in the example of FIG. 4, in response to an occurrence of a request for data transmission in accordance with the first communication architecture type (e.g., SMS transmission) while the UE 1 is executing the suspension operation for the second communication architecture type, the UE 1 initiates communication in accordance with the first communication architecture type (i.e., data transmission over NAS) while retaining the previous RRC connection context. Thus, even when the data transmission over NAS occurs while the UE 1 is executing the suspension operation for the second communication architecture type, the UE 1 can be continuing the suspension operation for the second communication architecture type.

In the example of FIG. 4, in order to perform the communication of the first communication architecture type, the UE 1 transmits to the RAN 2 RRC messages (e.g., RRC Connection Resume Request, RRC Connection Resume Complete) that are used for resuming the RRC connection in the RRC connection resume procedure (Steps 404 to 406). The UE 1 may include an indication of DoNAS transmission in any one or all of these uplink RRC messages. Additionally or alternatively, the UE 1 may include an indication of DoNAS transmission in the NAS message carrying small data (e.g., SMS data).

Additionally or alternatively, the UE 1 may include information about a buffer volume (i.e., buffer status) in any one or all of these uplink RRC messages. The information about the buffer volume is newly defined for communication for DoNAS, namely, for transmitting information over the control plane (i.e., SRB). The information about the buffer volume indicates a buffer volume regarding a bearer that is not yet established and also indicates a buffer volume regarding data to be transmitted on an SRB. That is, the information about the buffer volume differs from the Buffer Status Report (BSR), which has been defined in LTE and is to be carried by an MAC Control Element (MAC CE). Thus, the RRC message containing the information about the buffer volume can indicate DoNAS transmission.

Additionally or alternatively, radio resources (e.g., time, frequency, preamble index pool) used for random access preamble transmission may be distinguished in advance between the first communication architecture type and the second communication architecture. In this case, the RAN 2 can determine whether it is intended for DoNAS transmission, depending on which radio resource is used.

According to these techniques, the RAN 2 can recognize that the RRC connection resume procedure is intended for DoNAS. Further, the RAN 2 may explicitly inform the CN 3 that the RRC connection resume procedure is intended for DoNAS transmission (e.g., Selected CIoT EPS optimization). Additionally or alternatively, the RAN 2 (or the UE 1) may include, in the NAS information (e.g., NAS Control PDU), information explicitly or implicitly indicating that the RRC connection resume procedure is intended for DoNAS (e.g., Preferred Network Behaviour). A method for an implicit indication may include, for example, setting all bearer IDs (e.g., E-RAB IDs) included in an E-RAB To Be Resumed List IE indicating bearer(s) to be resumed to an invalid value or 0, blanking the E-RAB To Be Resumed List IE, or including E-RAB IDs of all established (i.e., suspended) bearers in the E-RAB Failed To Resume List IE. This allows the CN 3 to recognize that the RRC connection resume procedure is intended for DoNAS. Thus, for example, the RAN 2 and CN 3 can operate such that they do not perform signaling (Steps 408 and 409) to resume the S1-U bearer(s) that is not required for the DoNAS transmission.

In some implementations, the UE 1 may include an establishment cause associated with DoNAS or a resume cause associated with DoNAS in the RRC Connection Resume Request (Step 404). The UE 1 may include the establishment cause associated with DoNAS or the resume cause associated with DoNAS in the RRC Connection Resume Complete (Step 406). The establishment cause or resume cause may be defined as "mo-Data-DoNAS". Alternatively, the UE 1 may include information (e.g., 1-bit flag) indicating whether the communication is intended for DoNAS in the resume ID. In these ways, the RAN 2 can recognize that the RRC connection resume procedure (Steps 404 to 406) is performed for DoNAS. The RAN 2 may include the establishment cause associated with DoNAS, the resume cause associated with DoNAS, or an information element corresponding to them in the S1AP message of Step 407. This allows the RAN 2 to inform the CN 3 that the resumption of the S1-U bearer(s) is not required.

Furthermore, in the procedure of FIG. 4, to facilitate the interaction between the NAS layer and the AS layer (e.g., RRC layer) in the UE 1, the NAS layer of the UE 1 may operate as follows. Note that the NAS layer provides mobility management and session management, while the AS layer provides radio resource control (RRC).

In the procedure of FIG. 4, the NAS layer of the UE 1 needs to request the AS layer to start the RRC Connection Resume procedure for the second communication architecture type (i.e., AS Context Cashing) while specifying (or triggering) the execution of the first communication architecture type (i.e., DoNAS). In order to achieve this, for example, when SMS data is transmitted in DoNAS, the NAS layer of the UE 1 may generate a NAS message carrying this SMS data and provide an RRC connection establishment request to the AS layer. This RRC connection establishment request contains a call type (i.e., originating SMS) indicating SMS transmission from a mobile, and a new establishment cause for DoNAS (e.g., mo-Data-DoNAS).

Instead, when non-IP data is transmitted in DoNAS, the NAS layer of the UE 1 generates a NAS message carrying this non-IP data and provide an RRC connection establishment request to the AS layer. This RRC connection establishment request contains a new call type (i.e., originating Non-IP call) indicating non-IP data transmission from a mobile, and a new establishment cause for DoNAS (e.g., mo-Data-DoNAS).

According to these operations, the AS layer of the UE 1 can recognize that the RRC Connection Resume procedure for the second communication architecture type (i.e., AS Context Cashing) is executed for the first communication architecture type (i.e., DoNAS) based on the new combination of the call type and the establishment cause.

Third Embodiment

In this embodiment, a configuration example of a radio communication network is similar to that in FIG. 2. The UE 1 according to this embodiment may be a CIoT device (e.g., NB-IoT, LTE eMTC), or may be another UE in LTE, LTE-Advanced, or modified versions thereof.

Figure 5:
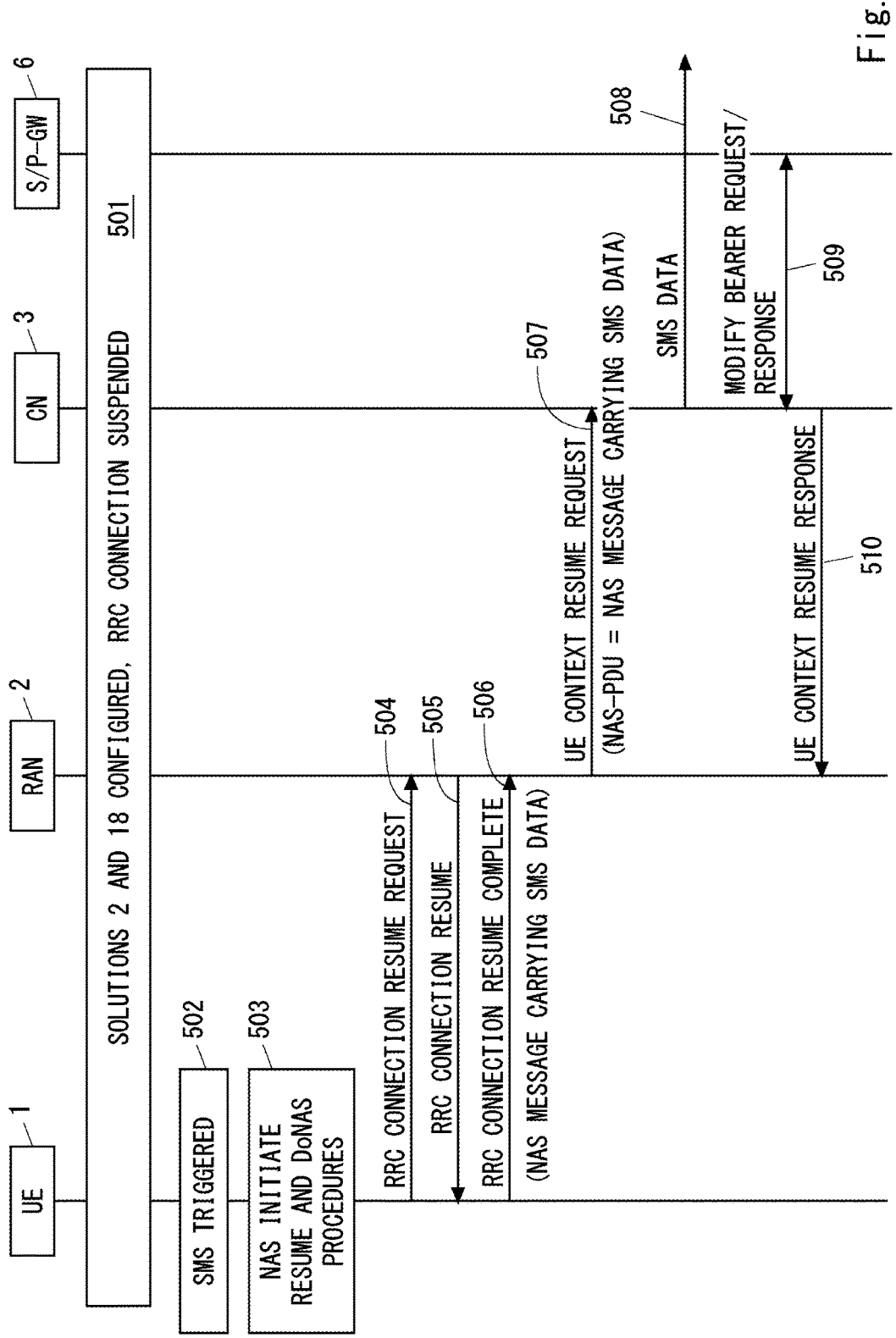
FIG. 5 is a sequence diagram showing an example of a communication procedure according to a third embodiment.

FIG. 5 is a sequence diagram showing an example of a communication procedure according to this embodiment. Steps 501 and 502 in FIG. 5 are similar to Steps 401 and 402 in FIG. 4, respectively. In Step 501, the UE 1 is configured by the CN 3 (e.g., MME, C-SGN) to use both the first communication architecture type (i.e., Solution 2) and the second communication architecture type (i.e., Solution 18). Furthermore, in Step 501, the UE 1 executes a suspension operation for the second communication architecture type.

In Step 502, data transmission in accordance with the first communication architecture type is triggered. That is, the UE 1 detects (or determines) an occurrence of a request for data transmission in accordance with the first communication architecture type while the UE 1 is executing the suspension operation for the second communication architecture type. As described in the first embodiment, the request for data transmission is sent from a higher layer (e.g., service/application layer, IMS layer, NAS layer) to a lower layer (e.g., NAS layer, AS layer), or sent from a lower layer (e.g., AS layer) to a higher layer (e.g., NAS layer). In the example of FIG. 5, the UE 1 is triggered for SMS transmission. Similarly to the description for Step 402, SMS transmission is merely an example of transmission suitable for the first communication architecture type.

In Step 503, in response to the occurrence of a request for data transmission in accordance with the first communication architecture type (e.g., SMS transmission) while the UE 1 is executing the suspension operation for the second communication architecture type, the UE 1 initiates communication in accordance with the first communication architecture type (i.e., data transmission over NAS) while retaining the previous RRC connection context. In the specific example shown in FIG. 5, the NAS layer of the UE 1 performs an RRC Connection Resume procedure for resuming an RRC connection and also performs a DoNAS transmission procedure (Steps 504 to 506). In other words, in the example of FIG. 5, the UE 1 performs the DoNAS transmission procedure that is integrated (or combined) with the RRC Connection Resume procedure.

In Steps 504 to 506, a NAS message carrying SMS data is transmitted from the UE 1 to the RAN 2 at the same time that the RRC connection is resumed. In Step 504, the UE 1 transmits an RRC Connection Resume Request message to the RAN 2 (e.g., eNB, CIoT-BS). In FIG. 5, a representation of the random access procedure is omitted. The RRC Connection Resume Request message of Step 504 may be transmitted in the third message (Msg 3) of the random access procedure. In Step 505, the RAN 2 resumes the RRC connection and transmits an RRC Connection Resume message to the UE 1. In Step 506, the UE 1 transmits an RRC Connection Resume Complete message to the RAN 2. The RRC Connection Resume Complete message of Step 506 contains the NAS message carrying the SMS data.

In Steps 507 to 510, the NAS message carrying the SMS data is transmitted from the RAN 2 to the CN 3 at the same time that the S1AP association and the S1-U bearer(s) for the UE 1 are resumed. In Step 507, the RAN 2 informs the CN 3 (e.g., MME, C-SGN) about a state change of the UE 1 using a new S1AP message (e.g., S1AP: UE Context Resume Request). The NAS-PDU in the S1AP message of Step 507 contains the NAS message carrying the SMS data.

In Step 508, the CN 3 (e.g., MME, C-SGN) decrypts the uplink NAS message sent from the UE 1 to obtain the small data. The CN 3 forwards the small data packet to another node, entity, or network, according to the data type of the small data. In the example of FIG. 5, the CN 3 sends the obtained SMS data to an entity related to SMS (e.g., SMS-GMSC, SMS-IWMSC, SMS router).

Steps 509 and 510 are similar to Steps 408 and 409 in FIG. 4, respectively. The CN 3 returns the ECM state of the UE 1 to the ECM-Connected state and transmits a Modify Bearer Request message to the S/P-GW 6 (Step 509). After that, the S/P-GW 6 recognizes that the UE 1 is in the connected state and hence becomes ready to transmit downlink data towards the UE 1. In Step 510, the CN 3 sends, to the RAN 2, a response message (e.g., S1AP: UE Context Resume Response) indicating the completion of the resumption of the S1AP association and S1-U bearer(s) for the UE 1.

As can be understood from the above description, in the example of FIG. 5, in response to an occurrence of a request for data transmission in accordance with the first communication architecture type (e.g., SMS transmission) while the UE 1 is executing the suspension operation for the second communication architecture type, the UE 1 initiates communication in accordance with the first communication architecture type (i.e., data transmission over NAS) while retaining the previous RRC connection context. Thus, similarly to the example of FIG. 4, even when the data transmission over NAS occurs while the UE 1 is executing the suspension operation for the second communication architecture type, the UE 1 can be continuing the suspension operation for the second communication architecture type.

Further, in the example of FIG. 5, the UE 1 performs the DoNAS transmission procedure that is integrated (or combined) with the RRC Connection Resume procedure. Thus, in the example of FIG. 5, the number of signalings required for the DoNAS transmission can be reduced compared with the example of FIG. 4.

Similarly to the example of FIG. 4, the RRC connection resume procedure shown in Steps 504 to 506 is merely an example. For example, the transmission from the UE 1 to the RAN 2 in Step 506 may be omitted. In this case, the UE 1 may include the NAS message carrying the SMS data in the RRC Connection Resume Request message of Step 504. For example, the RRC Connection Request (or the RRC Connection Reestablishment Request), the RRC Connection Setup (or the RRC Connection Reestablishment), and the RRC Connection Setup Complete (or the RRC Connection Reestablishment Complete) may be reused for the RRC connection resume procedure in Steps 504 to 506.

Further, similarly to the example of FIG. 4, in the example of FIG. 5, the UE 1 may include an indication of DoNAS transmission in any one or all of these uplink RRC messages (Steps 504 and 506). Additionally or alternatively, the UE 1 may include an indication of DoNAS transmission in the NAS message carrying small data (e.g., SMS data). Additionally or alternatively, the UE 1 may include information about a buffer volume (i.e., buffer status) in any one or all of these uplink RRC messages. Additionally or alternatively, radio resources (e.g., time, frequency, preamble index pool) used for random access preamble transmission may be distinguished in advance between the first communication architecture type and the second communication architecture. According to these techniques, the RAN 2, or the CN 3, or both can recognize that the RRC connection resume procedure is intended for DoNAS. Thus, for example, the RAN 2 and CN 3 can operate such that they do not perform signaling (Steps 509 and 510) to resume the S1-U bearer(s) that is not required for the DoNAS transmission.

Further, similarly to the example of FIG. 4, in the example of FIG. 5, when SMS data is transmitted in DoNAS, the NAS layer of the UE 1 may generate a NAS message carrying this SMS data and provide an RRC connection establishment request to the AS layer. This RRC connection establishment request contains a call type (i.e., originating SMS) indicating SMS transmission from a mobile, and a new establishment cause for DoNAS (e.g., mo-Data-DoNAS). Further, when non-IP data is transmitted in DoNAS, the NAS layer of the UE 1 may generate a NAS message carrying this non-IP data and provide an RRC connection establishment request to the AS layer. This RRC connection establishment request contains a new call type (i.e., originating Non-IP call) indicating non-IP data transmission from a mobile, and a new establishment cause for DoNAS (e.g., mo-Data-DoNAS).

Fourth Embodiment

In this embodiment, a configuration example of a radio communication network is similar to that in FIG. 2. The UE 1 according to this embodiment may be a CIoT device (e.g., NB-IoT, LTE eMTC), or may be another UE in LTE, LTE-Advanced, or modified versions thereof.

Figure 6:
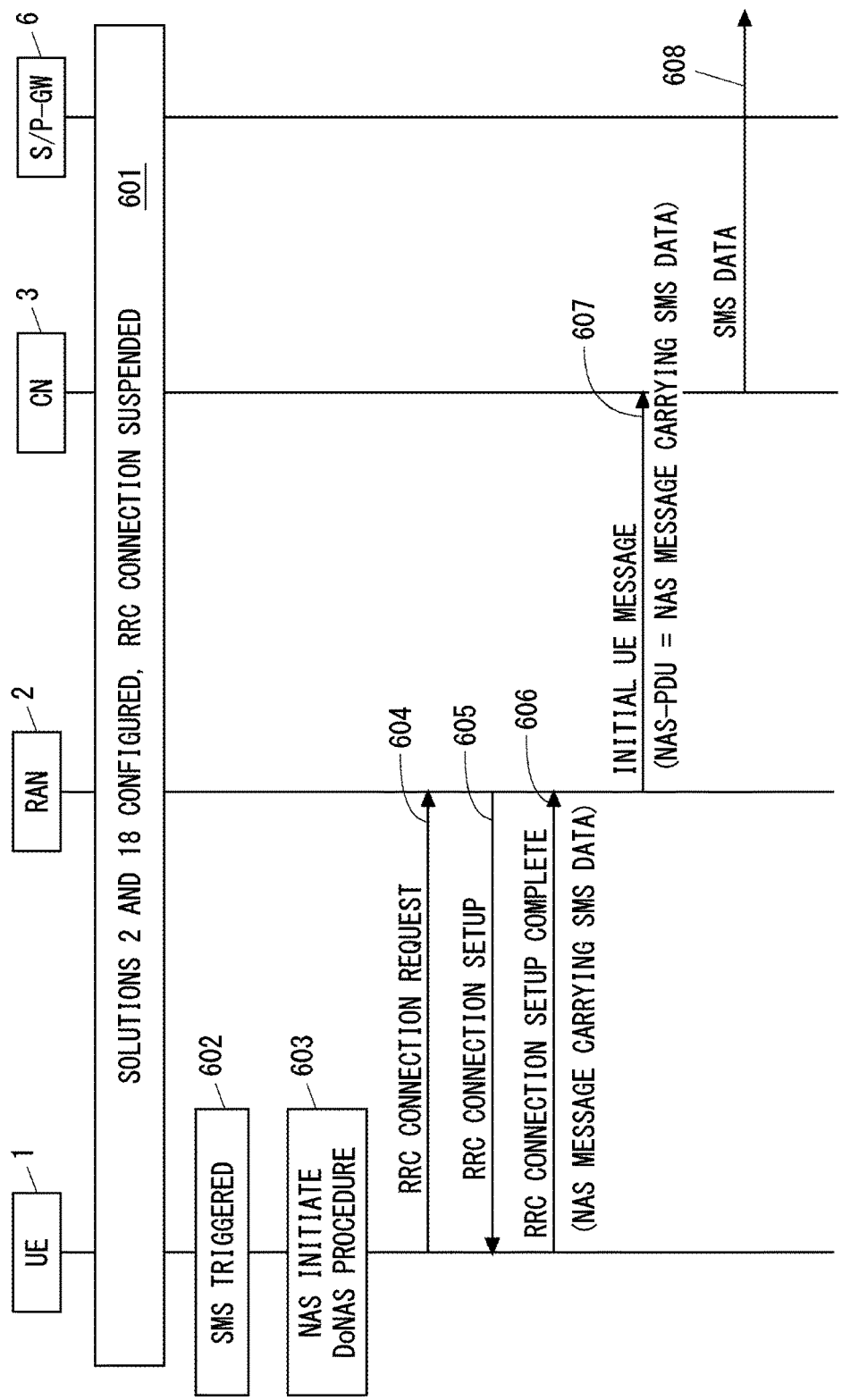
FIG. 6 is a sequence diagram showing an example of a communication procedure according to a fourth embodiment.

FIG. 6 is a sequence diagram showing an example of a communication procedure according to this embodiment. The procedure of FIG. 6 is similar to the above-described procedure of FIG. 5. However, in the procedure of FIG. 6, an RRC connection establishment procedure (Steps 604 to 606) is used for DoNAS data transmission, instead of the RRC connection resume procedure (Steps 504 to 506 in FIG. 5).

Steps 601 and 602 in FIG. 6 are similar to Steps 501 and 502 in FIG. 5, respectively. In Step 601, the UE 1 is configured by the CN 3 (e.g., MME, C-SGN) to use both the first communication architecture type (i.e., Solution 2) and the second communication architecture type (i.e., Solution 18). Furthermore, in Step 501, the UE 1 executes the suspension operation for the second communication architecture type.

In Step 602, data transmission in accordance with the first communication architecture type is triggered. That is, the UE 1 detects (or determines) an occurrence of a request for data transmission in accordance with the first communication architecture type while the UE 1 is executing the suspension operation for the second communication architecture type. As described in the first embodiment, the request for data transmission is sent from a higher layer (e.g., service/application layer, IMS layer, NAS layer) to a lower layer (e.g., NAS layer, AS layer), or sent from a lower layer (e.g., AS layer) to a higher layer (e.g., NAS layer). In the example of FIG. 6, the UE 1 is triggered for SMS transmission. Similarly to the description for Steps 402 and 502, SMS transmission is merely an example of transmission suitable for the first communication architecture type.

In Step 603, in response to the occurrence of a request for data transmission in accordance with the first communication architecture type (e.g., SMS transmission) while the UE 1 is executing the suspension operation for the second communication architecture type, the UE 1 initiates communication in accordance with the first communication architecture type (i.e., data transmission over NAS) while retaining the previous RRC connection context. In the example shown in FIG. 6, the NAS layer of the UE 1 performs the DoNAS transmission procedure that is integrated (or combined) with the RRC connection establishment procedure (Steps 604 to 606).

In Steps 604 to 606, a NAS message carrying the SMS data is transmitted from the UE 1 to the RAN 2 at the same time that the RRC connection is established. In Step 604, the UE 1 transmits an RRC Connection Request message to the RAN 2 (e.g., eNB, CIoT-BS). In FIG. 6, a representation of the random access procedure is omitted. The RRC Connection Request message of Step 604 may be transmitted in the third message (Msg 3) of the random access procedure. In Step 605, the RAN 2 transmits an RRC Connection Setup message to the UE 1. In Step 606, the UE 1 transmits an RRC Connection Setup Complete message to the RAN 2. The RRC Connection Setup Complete message of Step 506 contains the NAS message carrying SMS data.

In Step 607, the RAN 2 sends the NAS message carrying the SMS data to the CN 3 (e.g., MME, C-SGN) using an S1AP message (e.g., Initial UE Message). The NAS-PDU in the S1AP message of Step 607 contains the NAS message carrying the SMS data. The RAN 2 may select, from DCNs in the CN 3, a DCN corresponding to the first communication architecture type and send the S1AP message to the selected DCN.

In Step 608, the CN 3 (e.g., MME, C-SGN) decrypts the uplink NAS message sent from the UE 1 to obtain the small data. The CN 3 forwards the small data packet to another node, entity, or network, according to the data type of the small data. In the example of FIG. 6, the CN 3 sends the obtained SMS data to an entity related to SMS (e.g., SMS-GMSC, SMS-IWMSC, SMS router).

As can be understood from the above description, in the example of FIG. 6, in response to an occurrence of a request for data transmission in accordance with the first communication architecture type (e.g., SMS transmission) while the UE 1 is executing the suspension operation for the second communication architecture type, the UE 1 initiates communication in accordance with the first communication architecture type (i.e., data transmission over NAS) while retaining the previous RRC connection context. Thus, similarly to the example of FIGS. 4 and 5, even when the data transmission over NAS occurs while the UE 1 is executing the suspension operation for the second communication architecture type, the UE 1 can be continuing the suspension operation for the second communication architecture type.

Further, in the example shown in FIG. 6, the UE 1 performs the DoNAS transmission procedure that is integrated (or combined) with the RRC connection establishment procedure. Thus, in the example of FIG. 6, the number of signalings required for the DoNAS transmission can be reduced compared with the example of FIG. 4.

Further, similarly to the example of FIG. 4, in the example of FIG. 6, the UE 1 may include an indication of DoNAS transmission in any one or all of these uplink RRC messages (Steps 604 and 606). Additionally or alternatively, the UE 1 may include an indication of DoNAS transmission in the NAS message carrying small data (e.g., SMS data). Additionally or alternatively, the UE 1 may include information about a buffer volume (i.e., buffer status) in any one or all of these uplink RRC messages. Additionally or alternatively, radio resources (e.g., time, frequency, preamble index pool) used for random access preamble transmission may be distinguished in advance between the first communication architecture type and the second communication architecture. According to these techniques, the RAN 2, or the CN 3, or both can recognize that the RRC connection resume procedure is intended for DoNAS.

Further, similarly to the example of FIG. 4, in the example of FIG. 6, when SMS data is transmitted in DoNAS, the NAS layer of the UE 1 may generate a NAS message carrying this SMS data and provide an RRC connection establishment request to the AS layer. This RRC connection establishment request contains a call type (i.e., originating SMS) indicating SMS transmission from a mobile, and a new establishment cause for DoNAS (e.g., mo-Data-DoNAS). Further, when non-IP data is transmitted in DoNAS, the NAS layer of the UE 1 may generate a NAS message carrying this non-IP data and provide an RRC connection establishment request to the AS layer. This RRC connection establishment request contains a new call type (i.e., originating Non-IP call) indicating non-IP data transmission from a mobile, and a new establishment cause for DoNAS (e.g., mo-Data-DoNAS).

The above description about this embodiment shows an example in which, when the UE 1 is executing the suspension operation for the second communication architecture type, it initiates communication in accordance with the first communication architecture type while retaining the previous RRC connection context. Upon ending the communication in accordance with the first communication architecture type, the UE 1 may transition to the RRC-Idle mode again, and then resume the RRC connection using this RRC connection context to transmit data in accordance with the second communication architecture type.

Alternatively, in this embodiment, the UE 1 may release (or discard) the previous RRC connection context when establishing the RRC connection to transmit data in accordance with the first communication architecture type.

Fifth Embodiment

In this embodiment, a configuration example of a radio communication network is similar to that in FIG. 2. The UE 1 according to this embodiment may be a CIoT device (e.g., NB-IoT, LTE eMTC), or may be another UE in LTE, LTE-Advanced, or modified versions thereof.

Figure 7:
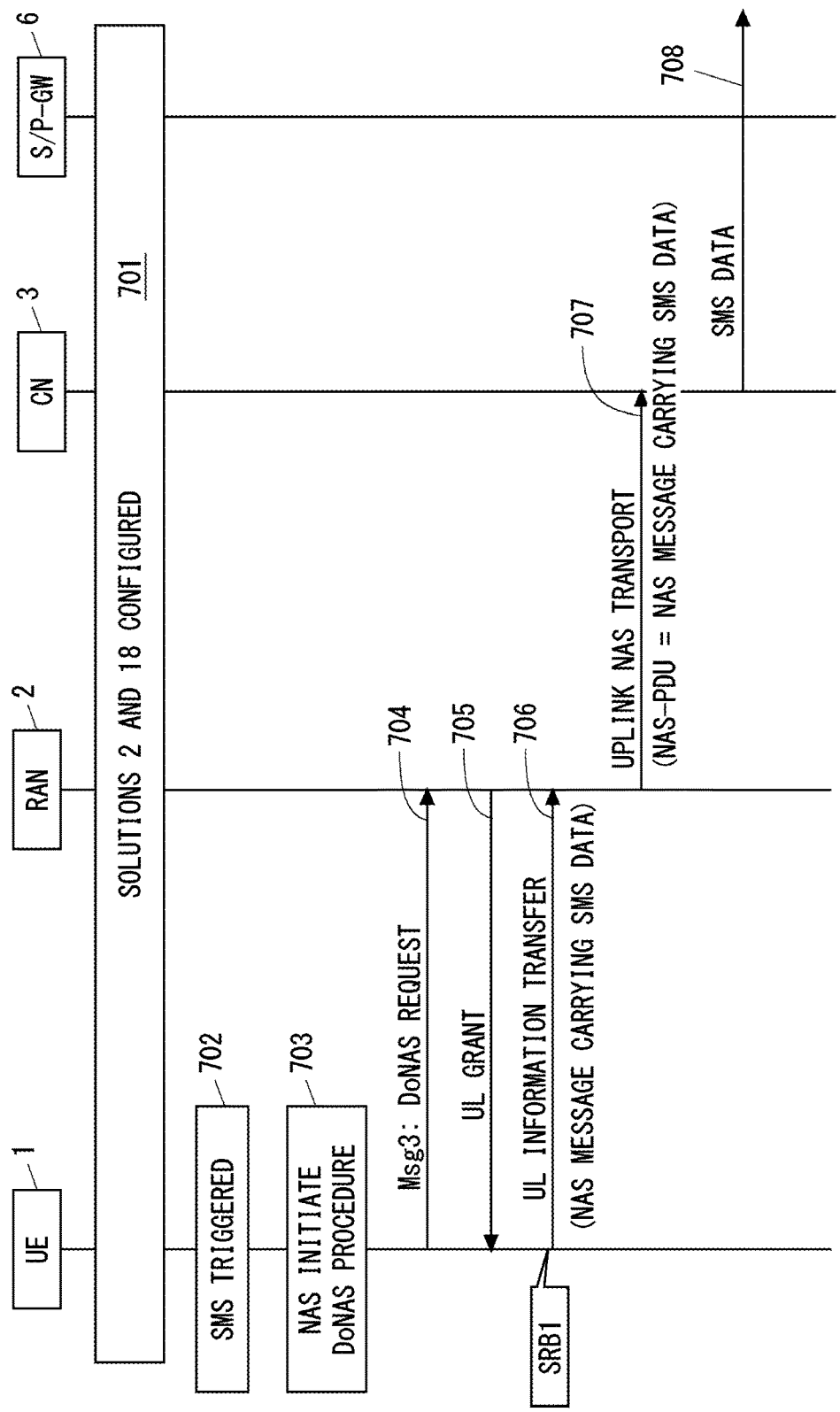
FIG. 7 is a sequence diagram showing an example of a communication procedure according to a fifth embodiment.

FIG. 7 is a sequence diagram showing an example of a communication procedure according to this embodiment. The procedure of FIG. 7 shows an example in which the UE 1 is configured by the CN 3 (e.g., MME, C-SGN) to use both the first and second communication architecture types and performs DoNAS transmission while the UE 1 is in the RRC Connected state.

In Step 701, the UE 1 is configured by the CN 3 (e.g., MME, C-SGN) to use both the first communication architecture type (i.e., Solution 2) and the second communication architecture type (i.e., Solution 18). In Step 702, when the UE 1 is in the RRC_Connected state, data transmission in accordance with the first communication architecture type is triggered. That is, the UE 1 detects (or determines) an occurrence of a request for data transmission in accordance with the first communication architecture type while the UE 1 is obeying the second communication architecture type and is in the RRC_Connected state. As described in the first embodiment, the request for data transmission is sent from a higher layer (e.g., service/application layer, IMS layer, NAS layer) to a lower layer (e.g., NAS layer, AS layer), or sent from a lower layer (e.g., AS layer) to a higher layer (e.g., NAS layer).

In Step 703, in response to the occurrence of a request for data transmission in accordance with the first communication architecture type (e.g., SMS transmission) while the UE 1 is obeying the second communication architecture type and in the RRC_Connected state, the NAS layer of the UE 1 initiates communication in accordance with the first communication architecture type (i.e., data transmission over NAS). In Step 704, in response to a request from the NAS layer of the UE 1, the AS layer of the UE 1 performs the random access procedure and transmits to the RAN 2 (e.g., eNB, CIoT-BS) a DoNAS request in the third message (Msg 3) of the random access procedure.

In Step 705, the RAN 2 transmits an uplink (UL) grant to the UE 1 in response to receiving the DoNAS request. The UL grant indicates allocation of uplink radio resources to enable the UE 1 to transmit a NAS message for DoNAS. In Step 706, the UE 1 transmits an RRC message (e.g., UL Information Transfer) containing a NAS message carrying SMS data to the RAN 2 according to the UL grant (Step 706). As already described, at the present time, it is assumed that neither the solution 2 nor the solution 18 will use SRB 2. Thus, the RRC message of Step 706 may be transmitted using SRB 1 on a Dedicated Control Channel (DCCH).

In Step 707, the RAN 2 sends the NAS message retrieved from the RRC message of Step 706 to the CN 3 (e.g., C-SGN, MME) using an S1AP message (e.g., Uplink NAS Transport). The NAS message is embedded in a NAS-Protocol Data Unit (PDU) information element (IE) of this S1AP message. The RAN 2 may select, from DCNs in the CN 3, a DCN corresponding to the first communication architecture type from within the CN 3 and send the S1AP message to the selected DCN.

In Step 708, the CN 3 (e.g., MME, C-SGN) decrypts the uplink NAS message from the UE 1 to obtain the small data. The CN 3 forwards the small data packet to another node, entity, or network, according to the data type of the small data. In the example of FIG. 7, the CN 3 sends the obtained SMS data to an entity related to SMS (e.g., SMS-GMSC, SMS-IWMSC, SMS router).

As can be understood from the above description, in the example of FIG. 7, when the UE 1 has been configured by the CN 3 to use the first and second communication architecture types and is in the RRC Connected state, the UE 1 can use the first communication architecture type to transmit specific types of data that are well suited to the transmission over the control plane.

In some implementations, the DoNAS request transmitted in Step 704 of FIG. 7 may be transmitted on a Physical Uplink Control Channel (PUCCH). The DONAS request may be carried by an Uplink Control Information (UCI) format newly defined or modified for the DoNAS request. When the UE 1 has available PUCCH resources, the UE 1 may transmit the DoNAS request over a PUCCH without performing the random access procedure.

In some implementations, the DoNAS request transmitted in Step 704 of FIG. 7 may be transmitted using an RRC message. This RRC message may indicate the establishment cause associated with DoNAS. Likewise, the RRC message (e.g., UL Information Transfer) in Step 706 may indicate the establishment cause associated with DoNAS.

Sixth Embodiment

In this embodiment, a configuration example of a radio communication network is similar to that in FIG. 2. The UE 1 according to this embodiment may be a CIoT device (e.g., NB-IoT, LTE eMTC), or may be another UE in LTE, LTE-Advanced, or modified versions thereof.

In this embodiment, the UE 1 is configured by the CN 3 to use either of the first and second communication architecture types and not to simultaneously use both the first and second communication architecture types.

Figure 8:
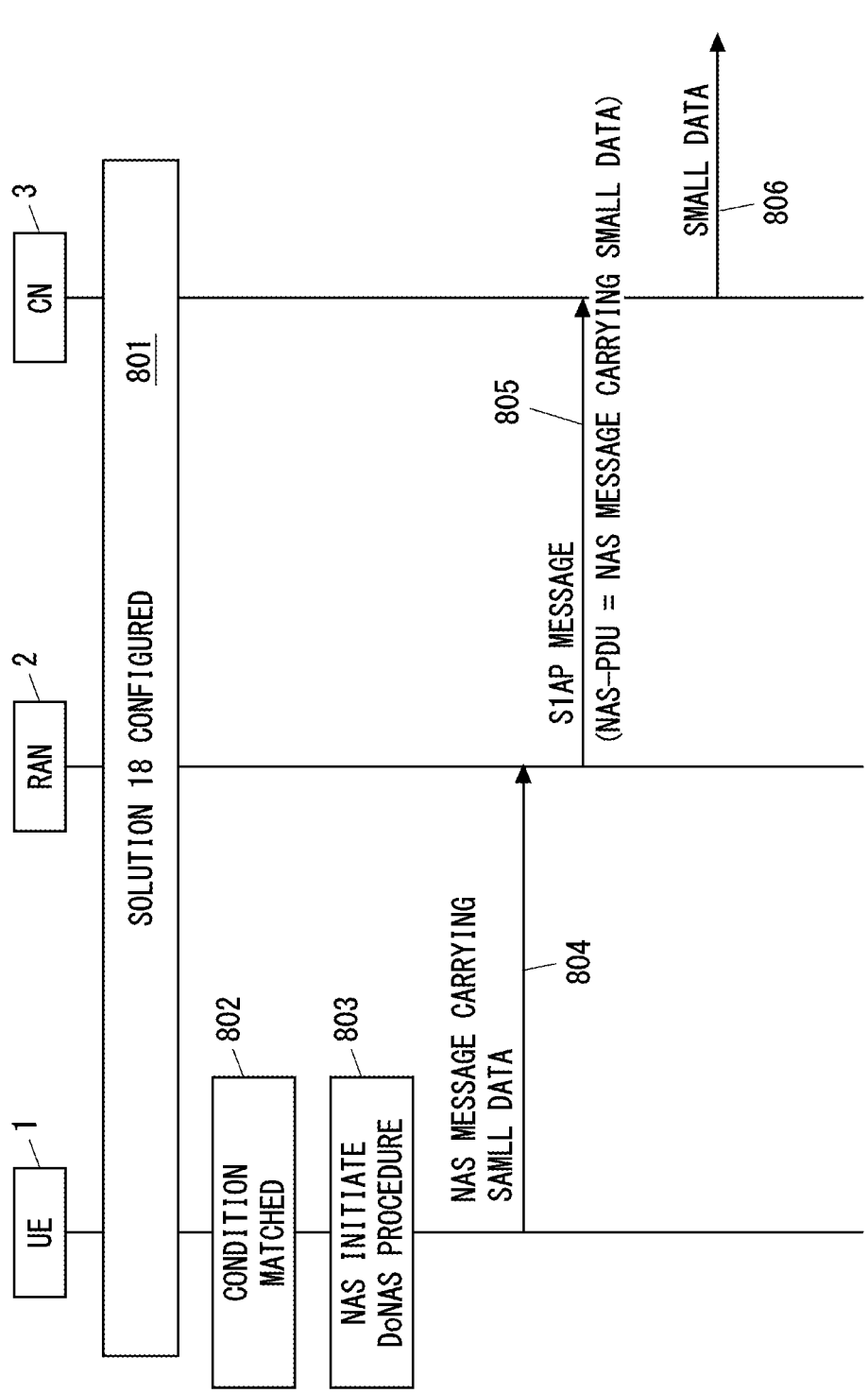
FIG. 8 is a sequence diagram showing an example of a communication procedure according to a sixth embodiment.

FIG. 8 is a sequence diagram showing an example of a communication procedure according to this embodiment. In the procedure of FIG. 8, in Step 801, the UE 1 is configured by the CN 3 (e.g., MME, C-SGN) to use only the second communication architecture type (i.e., Solution 18). The CN 3 may permit the UE 1 to use the first communication architecture type (i.e., Solution 2) when a pre-configured criterion is met.

In Step 802, the UE 1 determines that the pre-configured criterion is met. In other words, in Step 802, the NAS layer of the UE 1 determines whether a request for specific data transmission has been received from a higher layer (e.g., service/application layer, IMS layer). The pre-configured criterion or the request for specific data transmission triggers the UE 1 to transmit data in accordance with the first communication architecture type (i.e., data transmission over NAS).

In response to the occurrence of a request for specific data transmission when the UE 1 has already been configured by the CN 3 to use the second communication architecture type, the UE 1 switches from the second communication architecture type to the first communication architecture type and transmits data using the first communication architecture type. The procedure for the data transmission in accordance with the first communication architecture type may be similar to the Mobile Originated (MO) small data transmission procedure for the solution 2 (i.e., DoNAS) disclosed in Non Patent Literature 1.

That is, in Step 803, the NAS layer of the UE 1 initiates a DoNAS procedure for transmitting data on the NAS layer. In Step 804, the UE 1 generates a NAS message carrying small data and transmits an RRC message (e.g., RRC Connection Setup Complete, UL Information Transfer) containing this NAS message to the RAN 2 (e.g., CIoT-BS, eNB).

In Step 805, the RAN 2 receives the RRC message and sends the NAS message retrieved from the RRC message to the CN 3 (e.g., C-SGN, MME) using an S1AP message (e.g., Initial UE Message, Uplink NAS Transport). The NAS message is embedded into a NAS-Protocol Data Unit (PDU) information element (IE) of this S1AP message. The RAN 2 may select, from DCNs in the CN 3, a DCN corresponding to the first communication architecture type and send the S1AP message to the selected DCN.

In Step 806, the CN 3 (e.g., C-SGN, MME) decrypts the uplink NAS message sent from the UE 1 to obtain the small data. The CN 3 forwards the small data to another node, entity, or network, according to the data type of the small data.

In the example of FIG. 8, the specific data transmission may be similar to that of the example of FIG. 3 described in the first embodiment. For example, the specific data transmission may be non-IP data transmission, SMS data transmission, (IP) data transmission of only one packet, or data transmission related to a predetermined service.

According to the example of FIG. 8, when the UE 1 has already been configured by the CN 3 to use the second communication architecture type, the UE 1 can use the first communication architecture type to transmit specific types of data that are well suited to the transmission over the control plane. Thus, the UE 1 can effectively perform communication in accordance with the first communication architecture type when the UE 1 has already been configured by the CN 3 to use the second communication architecture type.

Specifically, in response to an occurrence of a request for specific data transmission when the UE 1 has already been configured by the CN 3 to use only the second communication architecture type, the UE 1 switches from the second communication architecture type to the first communication architecture type. That is, the UE 1 is configured with only one of the first and second communication architecture types and thus it does not need to support a simultaneous setup of these two solutions. This simplifies the configuration of the UE 1. Such a configuration is particularly effective for NB-CIoT that requires cost optimization and low power consumption.

Seventh Embodiment

In this embodiment, a configuration example of a radio communication network is similar to that in FIG. 2. The UE 1 according to this embodiment may be a CIoT device (e.g., NB-IoT, LTE eMTC), or may be another UE in LTE, LTE-Advanced, or modified versions thereof.

Figure 9:
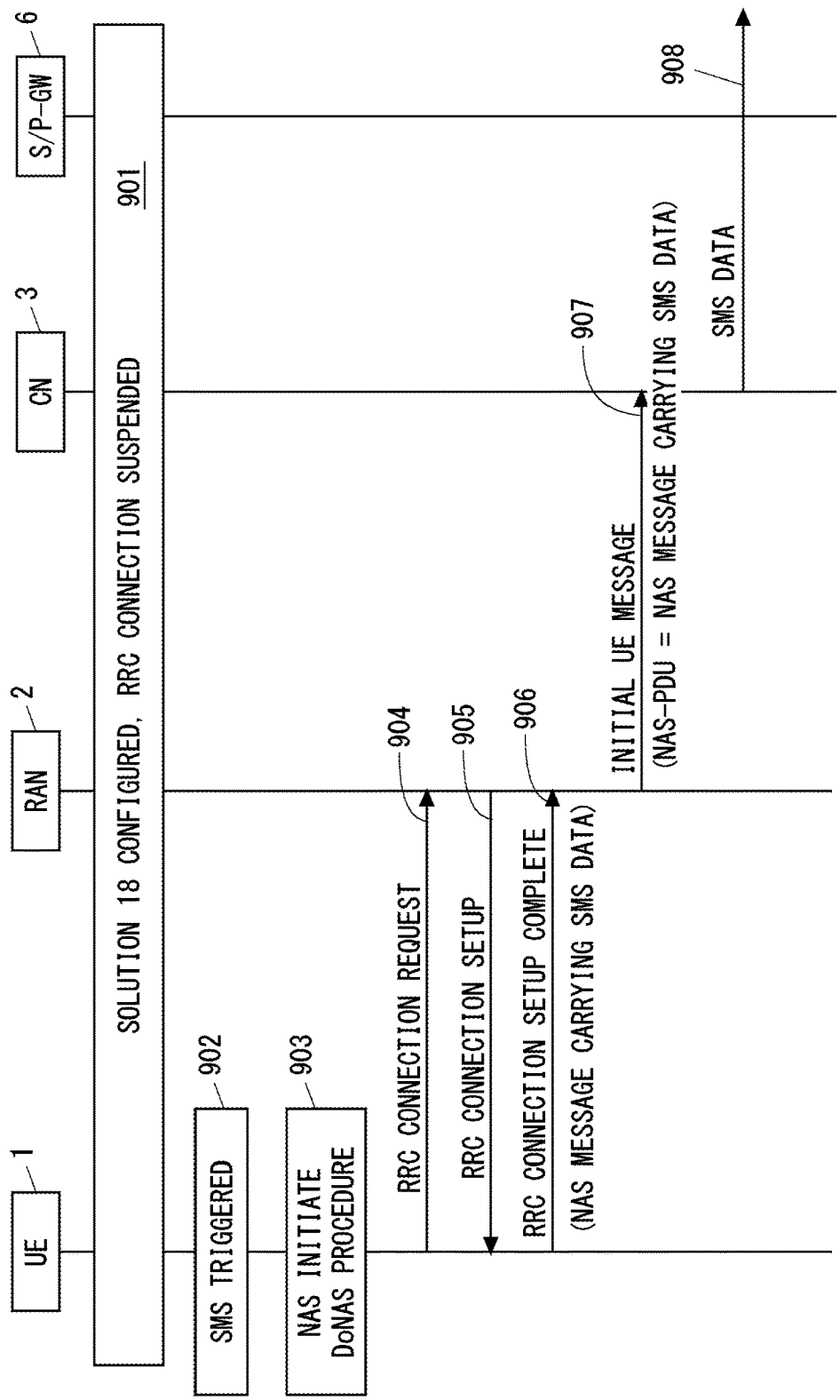
FIG. 9 is a sequence diagram showing an example of a communication procedure according to a seventh embodiment.

FIG. 9 is a sequence diagram showing an example of a communication procedure according to this embodiment. Similarly to the procedure of FIG. 8, in the procedure of FIG. 9, in Step 901, the UE 1 is configured by the CN 3 (e.g., MME, C-SGN) to use only the second communication architecture type (i.e., Solution 18). The CN 3 may permit the UE 1 to use the first communication architecture type (i.e., Solution 2) when a specific criterion is met. In Step 901, the UE 1 performs a suspension operation for the second communication architecture type. Specifically, the UE 1 retains a context regarding a previous RRC connection while it is in the RRC idle state (e.g., CIoT RRC idle state).

In Step 902, data transmission in accordance with the first communication architecture type is triggered. That is, the UE 1 detects (or determines) an occurrence of a request for data transmission in accordance with the first communication architecture type while the UE 1 is executing the suspension operation for the second communication architecture type. As described in the first embodiment, the request for data transmission is sent from a higher layer (e.g., service/application layer, IMS layer, NAS layer) to a lower layer (e.g., NAS layer, AS layer), or sent from a lower layer (e.g., AS layer) to a higher layer (e.g., NAS layer). In the example of FIG. 9, the UE 1 is triggered for SMS transmission. Note that the SMS transmission is merely an example of transmission suitable for the first communication architecture type. As described in the first embodiment, in Step 902, the UE 1 may be triggered for non-IP data transmission, (IP) data transmission of only one packet, or data transmission related to a predetermined service.

In Step 903, in response to the occurrence of a request for data transmission in accordance with the first communication architecture type (e.g., SMS transmission) while the UE 1 is executing the suspension operation for the second communication architecture type, the UE 1 switches from the second communication architecture type to the first communication architecture type and initiates communication in accordance with the first communication architecture type (i.e., data transmission over NAS). The procedure for the data transmission in accordance with the first communication architecture type may be similar to the Mobile Originated (MO) small data transmission procedure for the solution 2 (i.e., DoNAS) disclosed in Non Patent Literature 1.

That is, in Steps 904 to 906, the UE 1 executes an RRC connection establishment procedure. In Steps 904 to 906, a NAS message carrying SMS data is transmitted from the UE 1 to the RAN 2 at the same time that the RRC connection is established. In Step 904, the UE 1 transmits an RRC Connection Request message to the RAN 2 (e.g., eNB, CIoT-BS). In FIG. 9, a representation of the random access procedure is omitted. The RRC Connection Request message of Step 904 may be transmitted in the third message (Msg 3) of the random access procedure. In Step 905, the RAN 2 transmits an RRC Connection Setup message to the UE 1. In Step 906, the UE 1 transmits an RRC Connection Setup Complete message to the RAN 2. The RRC Connection Setup Complete message of Step 906 contains the NAS message carrying SMS data.

In Step 907, the RAN 2 sends the NAS message carrying the SMS data to the CN 3 (e.g., MME, C-SGN) using an S1AP message (e.g., Initial UE Message). The NAS-PDU in the S1AP message of Step 907 contains the NAS message carrying the SMS data. The RAN 2 may select, from DCNs in the CN 3, a DCN corresponding to the first communication architecture type and send the S1AP message to the selected DCN.

In Step 908, the CN 3 (e.g., MME, C-SGN) decrypts the uplink NAS message sent from the UE 1 to obtain the small data. The CN 3 forwards the small data packet to another node, entity, or network, according to the data type of the small data. In the example of FIG. 9, the CN 3 sends the obtained SMS data to an entity related to SMS (e.g., SMS-GMSC, SMS-IWMSC, SMS router).

In some implementations, when the UE 1 initiates data transmission in accordance with the first communication architecture (Step 903), it may delete or release the previous RRC connection context retained for the suspension operation for the second communication architecture type. The memory area in which this RRC connection context has been stored may be reused to store an RRC connection context for the communication in accordance with the first communication architecture type. In other words, the previous RRC connection context for the suspension operation for the second communication architecture type may be overwritten (or updated) by a new RRC connection context for the communication in accordance with the first communication architecture type. Such configuration and operation can reduce the memory capacity that the UE 1 should have, which is particularly effective for NB-CIoT that requires cost optimization and low power consumption.

When the previous RRC connection context retained in the UE 1 for the suspension operation for the second communication architecture type is deleted or released, the UE 1 may inform the RAN 2, or the CN 3, or both about this deletion or release. Specifically, in the control procedure (Steps 904 to 907) for initiating the communication in accordance with the first communication architecture type, the UE 1 may transmit an indication indicating discarding of the RRC connection context to the network (i.e., the RAN 2, or the CN 3, or both). For example, the UE 1 may include the indication in an RRC message (e.g., RRC Connection Request, RRC Connection Setup Complete), or a NAS message, or both.

In response to receiving this indication from the UE 1, the RAN 2 may recognize that the information (e.g., RRC connection context, S1AP association, S1-U bearer context) retained in the RAN 2 for the suspension operation is allowed to be discarded or released. Likewise, in response to receiving the indication from the UE 1, the CN 3 may recognize that the information (e.g., S1AP association, S1-U bearer context) retained in the CN 3 for the suspension operation is allowed to be discarded or released. Such configuration and operation can prevent the suspended states of the UE 1 and the network from being inconsistent with each other.

Alternatively, when the UE 1 initiates data transmission in accordance with the first communication architecture (Step 903), the UE 1 may maintain the previous RRC connection context retained for the suspension operation for the second communication architecture type.

Figure 10:
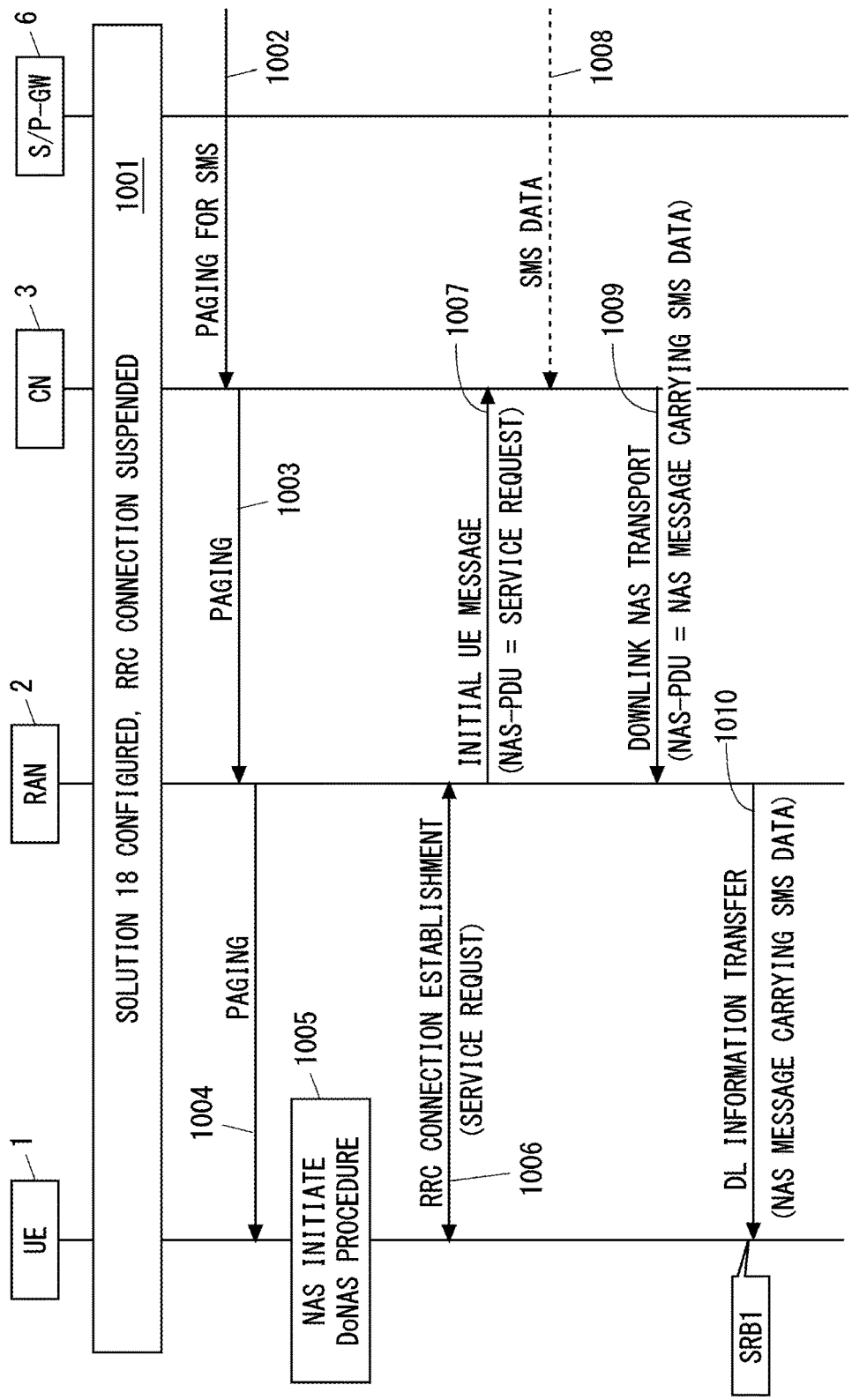
FIG. 10 is a sequence diagram showing another example of the communication procedure according to the seventh embodiment.

FIG. 10 is a sequence diagram showing another example of the communication procedure according to this embodiment. FIG. 10 shows an example of Mobile Terminated (MT) small data transmission. Step 1001 is similar to Step 901 in FIG. 9. In Step 1002, the CN 3 (e.g., MME, C-SGN) receives a paging message indicating the arrival of Mobile-Terminated SMS data addressed to the UE 1. The CN 3 may receive SMS data in Step 1002. In this case, Step 1008 described below may be omitted.

In Step 1003, the CN 3 sends a paging message to the RAN 2. Specifically, the CN 3 sends a paging message to respective eNBs (or CIoT-BSs) associated with one or more cells belonging to one or more tracking areas of the UE 1. In Step 1004, the UE 1 is paged by the RAN 2.

In Step 1005, in response to receiving the paging related to the first communication architecture type while the UE 1 is executing the suspension operation for the second communication architecture type, the UE 1 switches from the second communication architecture type to the first communication architecture type and initiates communication in accordance with the first communication architecture type (i.e., data transmission over NAS). Here, the paging related to the first communication architecture type may include, for example, information explicitly or implicitly indicating that the data transmission in accordance with the first communication architecture type is to be carried out. The explicit information may be information indicating one of the first communication architecture type and the second communication architecture type, or information indicating the first communication architecture type. The implicit information may be a bearer ID. Alternatively, the UE 1 may be configured to always respond using the first communication architecture type whenever it is paged.

The procedure for the data transmission in accordance with the first communication architecture type may be similar to the Mobile Terminated (MT) small data transmission procedure for the solution 2 (i.e., DoNAS) disclosed in Non Patent Literature 1. That is, in Step 1006, the UE 1 establishes an RRC connection and transmits a NAS message (i.e., Service Request) to the CN 3 using an RRC Connection Setup Complete message (Step 1007). The CN 3 receives SMS data (Step 1008), encapsulates this SMS data in a NAS message, and sends this NAS message to the RAN 2 (Step 1009). The RAN 2 receives the NAS message carrying the SMS data from the CN 3 and transmits an RRC message (e.g., DL Information Transfer) containing this NAS message to the UE 1 (Step 1010). As already described, at the present time, it is assumed that neither the solution 2 nor the solution 18 will use SRB 2. Thus, the RRC message of Step 1010 may be transmitted using SRB 1 on a Dedicated Control Channel (DCCH).

Similarly to the example of FIG. 9, in the example of FIG. 10, when the previous RRC connection context retained in the UE 1 for the suspension operation for the second communication architecture type is deleted or released, the UE 1 may inform the RAN 2, or the CN 3, or both about this deletion or release. In response to receiving this indication from the UE 1, the RAN 2 may recognize that the information (e.g., RRC connection context, S1AP association, S1-U bearer context) retained in the RAN 2 for the suspension operation is allowed to be discarded or released. Likewise, in response to receiving this indication from the UE 1, the CN 3 may recognize that the information (e.g., S1AP association, S1-U bearer context) retained in the CN 3 for the suspension operation is allowed to be discarded or released. Such configuration and operation can prevent the suspended states of the UE 1 and the network from being inconsistent with each other.

Eighth Embodiment

In this embodiment, a configuration example of a radio communication network is similar to that in FIG. 2. The UE 1 according to this embodiment may be a CIoT device (e.g., NB-IoT, LTE eMTC), or may be another UE in LTE, LTE-Advanced, or modified versions thereof.

As already described, at the present time, it is assumed that the solution 2 (i.e., DoNAS, Control Plane CIoT EPS optimisation) does not use the AS security and the PDCP. In some implementations, DoNAS communication that does not use the PDCP may be performed simply without traversing the PDCP layer. Alternatively, a new operation mode (e.g., PDCP Transparent Mode (PDCP-TM)) of the PDCP layer may be defined for DoNAS communication that does not use the PDCP. In such new operation mode (PDCP-TM), the PDCP layer does not provide some PDCP-layer functions including the AS security function (e.g., integrity protection for SRB, ciphering).

Some of the above-described embodiments have shown examples in which the UE 1 executes the RRC Connection Resume procedure to initiate data transmission in accordance with the first communication architecture type while the UE 1 is executing the suspension operation for the second communication architecture type (e.g., FIGS. 4 and 5). Since the second communication architecture type (i.e., AS context caching, User Plane CIoT EPS optimisation) uses the AS security, the UE 1 and RAN 2 perform security activation (or confirmation) at one of the stages of the RRC Connection Resume procedure. Thus, when the AS security has already been activated in the RRC Connection Resume procedure, the UE 1 and RAN 2 may apply the AS security (e.g., integrity protection for SRB, ciphering) to the communication of the first communication architecture type (i.e., DoNAS, Control Plane CIoT EPS optimisation).

Ninth Embodiment

3GPP plans to start working on the standardization for 5G, i.e., 3GPP Release 14, in 2016 towards the introduction of 5G in 2020. 5G is expected to be realized by continuous enhancement/evolution of LTE and LTE-Advanced and an innovative development by an introduction of a new 5G air-interface (i.e., a new Radio Access Technology (RAT)). The new RAT (i.e., New 5G RAT) supports, for example, frequency bands higher than the frequency bands (e.g., 6 GHz or lower) supported by the LTE/LTE-Advanced and its enhancement/evolution. For example, the new RAT supports centimeter-wave bands (10 GHz or higher) and millimeter-wave bands (30 GHz or higher).

Higher frequency can provide higher-rate communication. However, because of its frequency properties, coverage of the higher frequency is more local. Therefore, high frequencies are used to boost capacity and data rates in specific areas, while wide-area coverage is provided by lower current frequencies. That is, in order to ensure the stability of New 5G RAT communication in high frequency bands, tight integration or interworking between low and high frequencies (i.e., tight integration or interworking between LTE/LTE-Advanced and New 5G RAT) is required. A 5G supporting radio terminal (i.e., 5G User Equipment (UE)) is connected to both of a low frequency band cell and a high frequency band cell (i.e., a LTE/LTE-Advanced cell and a new 5G cell) by using Carrier Aggregation (CA) or Dual Connectivity (DC), or a modified technique thereof.

The term "LTE" used in this specification includes enhancements of LTE and LTE-Advanced for 5G to provide tight interworking with the New 5G RAT, unless otherwise indicated. Such enhancements of LTE and LTE-Advanced are also referred to as LTE-Advanced Pro, LTE+, or enhanced LTE (eLTE). Further, the term "5G" or "New 5G" in this specification is used, for the sake of convenience, to indicate an air-interface (RAT) that is newly introduced for the fifth generation (5G) mobile communication systems, and nodes, cells, protocol layers, etc. related to this air-interface. The names of the newly introduced air interface (RAT), and nodes, cells, and protocol layers related thereto will be determined in the future as the standardization work progresses. For example, the LTE RAT may be referred to as Primary RAT (P-RAT or pRAT) or Master RAT. Meanwhile, the New 5G RAT may be referred to as Secondary RAT (S-RAT or sRAT).

The first to eighth embodiments described above may be applied to a 5G radio communication network that provides tight interworking between the LTE RAT and the New 5G RAT. In some implementations, the UE 1, RAN 2, and CN 3 may perform any one of the attach procedures described in the first to eighth embodiments in the LTE RAT then perform data transmission in the New 5G RAT according to a communication architecture type determined (or selected) in the attach procedure.

For example, when the first communication architecture type is used for the UE 1, the UE 1 may transmit data using a UL Information Transfer message in the 5G cell, instead of using an RRC Connection Setup Complete message in the LTE cell, and receive data using a DL Information Transfer message in the 5G cell. For example, when the second communication architecture type is used for the UE 1, the UE 1, the RAN 2, and the CN 3 may perform suspension and resumption of an RRC connection in the 5G cell. In this process, the UE 1 and the RAN 2 may be connected to both a core network node for communication in the LTE cell and a core network node different from that for the communication in the LTE cell.

Figure 11:
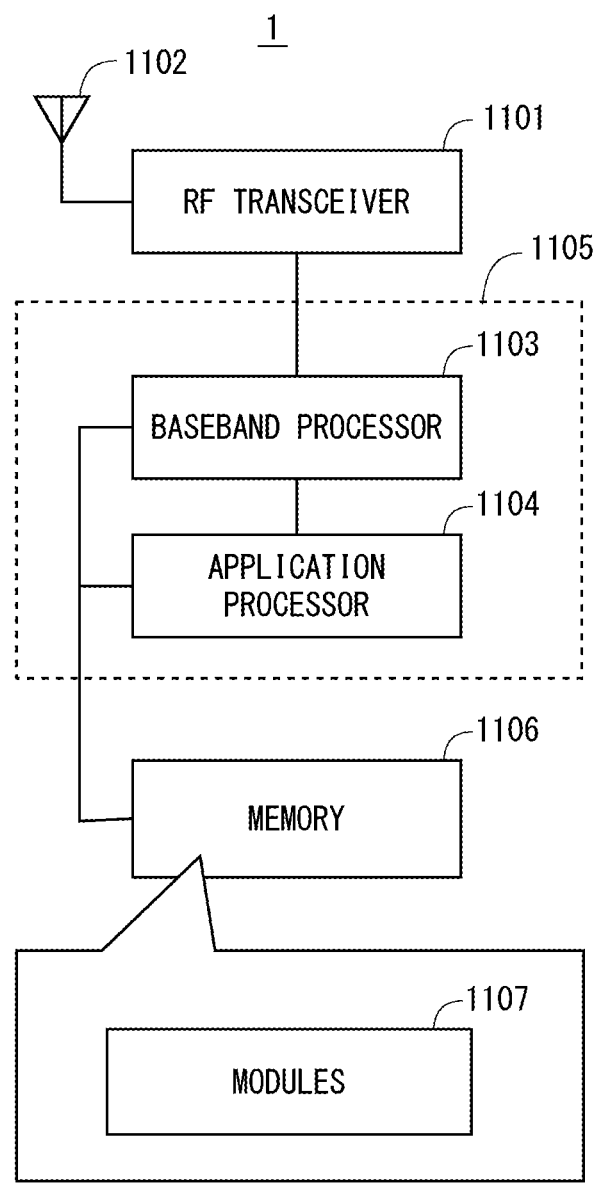
FIG. 11 is a block diagram showing a configuration example of a radio terminal according to some embodiments.

Lastly, configuration examples of the UE 1, the nodes in the RAN 2 (e.g., CIoT BS, eNB), and the nodes in the CN 3 (e.g., C-SGN, MME) according to the above-described plurality of embodiments will be described. FIG. 11 is a block diagram showing a configuration example of the UE 1. A Radio Frequency (RF) transceiver 1101 performs analog RF signal processing to communicate with the RAN 2. The analog RF signal processing performed by the RF transceiver 1101 includes frequency up-conversion, frequency down-conversion, and amplification. The RF transceiver 1101 is coupled to an antenna 1102 and a baseband processor 1103. That is, the RF transceiver 1101 receives modulation symbol data (or OFDM symbol data) from the baseband processor 1103, generates a transmission RF signal, and supplies the transmission RF signal to the antenna 1102. Moreover, the RF transceiver 1101 generates a baseband reception signal based on a reception RF signal received by the antenna 1102, and supplies the baseband reception signal to the baseband processor 1103.

The baseband processor 1103 performs digital baseband signal processing (data-plane processing) and control-plane processing for radio communication. The digital baseband signal processing includes, for example, (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of the layer 1 (e.g., transmission power control), layer 2 (e.g., radio resource management and hybrid automatic repeat request (HARQ) processing), and layer 3 (e.g., signaling regarding attach, mobility, and call management).

In the case of LTE and LTE-Advanced, for example, the digital baseband signal processing by the baseband processor 1103 may include signal processing of the Packet Data Convergence Protocol (PDCP) layer, Radio Link Control (RLC) layer, Medium Access Control (MAC) layer, and Physical (PHY) layer. Further, the control-plane processing by the baseband processor 1103 may include the processing of the Non-Access Stratum (NAS) protocol, the RRC protocol, and the MAC Control Elements (MAC CEs).

The baseband processor 1103 may include a modem processor (e.g., Digital Signal Processor (DSP)) that performs the digital baseband signal processing and a protocol stack processor (e.g., Central Processing Unit (CPU) or Micro Processing Unit (MPU)) that performs the control-plane processing. In this case, the protocol stack processor, which performs the control-plane processing, may be integrated with an application processor 1104 described in the following.

The application processor 1104 may also be referred to as a CPU, an MPU, a microprocessor, or a processor core. The application processor 1104 may include a plurality of processors (processor cores). The application processor 1104 loads a system software program (Operating System (OS)) and various application programs (e.g., a voice call application, a WEB browser, a mailer, a camera operation application, a music playback application) from a memory 1106 or from another memory (not shown) and executes these programs, thereby providing various functions of the UE 1.

In some implementations, as represented by the dashed line (1105) in FIG. 11, the baseband processor 1103 and the application processor 1104 may be integrated on a single chip. In other words, the baseband processor 1103 and the application processor 1104 may be implemented in a single System on Chip (SoC) device 1105. A SoC device may be referred to as a system Large Scale Integration (LSI) or a chipset.

The memory 1106 is a volatile memory or a non-volatile memory or a combination thereof. The memory 1106 is a volatile memory or a non-volatile memory or a combination thereof. The volatile memory is, for example, Static Random Access Memory (SRAM), Dynamic RAM (DRAM) or a combination thereof. The non-volatile memory may be a Mask Read Only Memory (MROM), an Electrically Erasable Programmable ROM (EEPROM), a flash memory, a hard disk drive, or any combination thereof. The memory 1106 may include an internal memory device integrated within the baseband processor 1103, the application processor 1104, or the SoC 1105. Further, the memory 1106 may include a memory in a Universal Integrated Circuit Card (UICC).

The memory 1106 may store one or more software modules (computer programs) 1107 including instructions and data for processing by the UE 1 described in the above embodiments. In some implementations, the baseband processor 1103 or the application processor 1104 may be load these one or more software modules 1107 from the memory 1106 and execute the loaded software modules, thereby performing the processing of the UE 1 described in the above embodiments.

Figure 12:
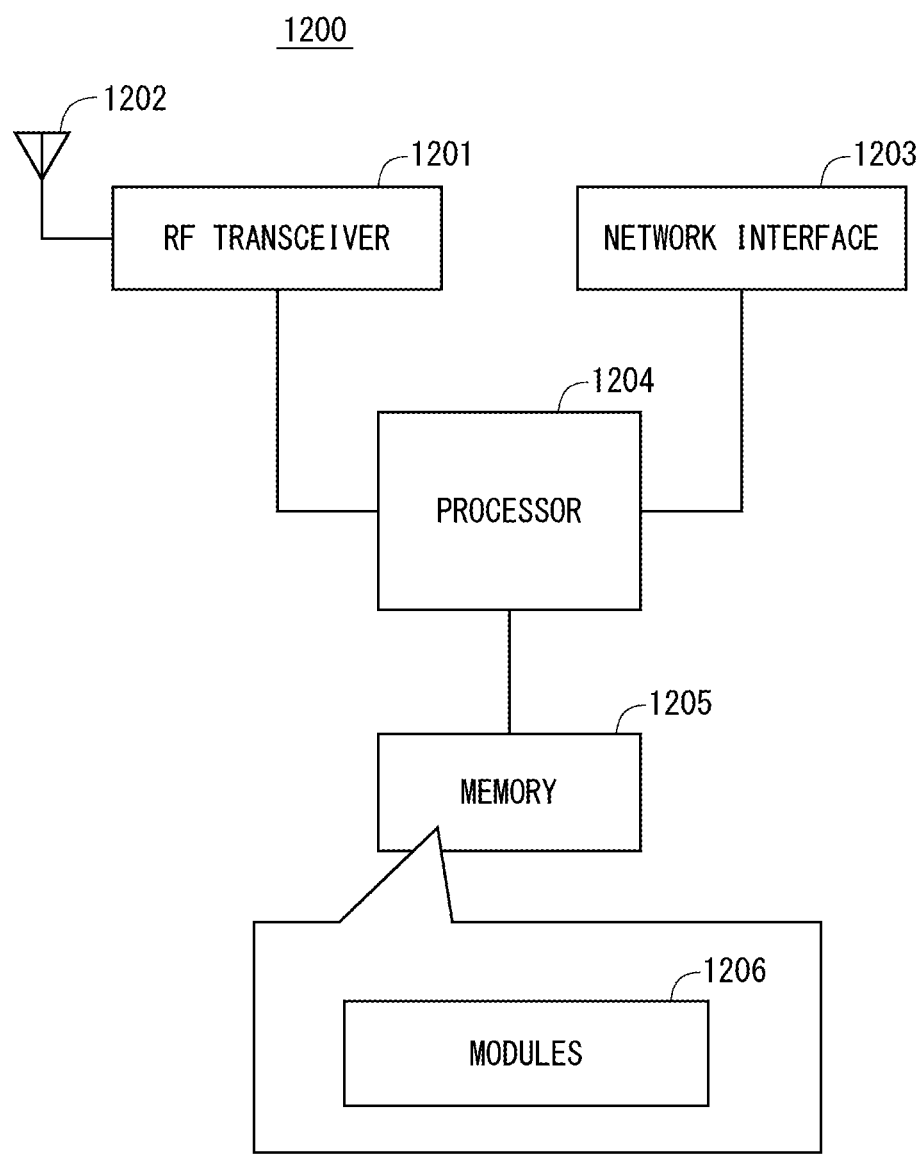
FIG. 12 is a block diagram showing a configuration example of a base station according to some embodiments.

FIG. 12 is a block diagram showing a configuration example of a node (e.g., CIoT BS, eNB) in the RAN 2 according to the above embodiments. Referring to FIG. 12, the node includes an RF transceiver 1201, a network interface 1203, a processor 1204, and a memory 1205. The RF transceiver 1201 performs analog RF signal processing to communicate with a radio terminal 1. The RF transceiver 1201 may include a plurality of transceivers.

The RF transceiver 1201 is coupled to an antenna 1202 and a processor 1204. The RF transceiver 1201 receives modulation symbol data (or OFDM symbol data) from the processor 1204, generates a transmission RF signal, and supplies the transmission RF signal to the antenna 1202. Moreover, the RF transceiver 1201 generates a baseband reception signal based on a reception RF signal received by the antenna 1202, and supplies the baseband reception signal to the processor 1204.

The network interface 1203 is used to communicate with network nodes (e.g., MME, C-SGN, S-GW). The network interface 1203 may include, for example, a network interface card (NIC) conforming to the IEEE 802.3 series.

The processor 1204 performs digital baseband signal processing (data-plane processing) and control-plane processing for radio communication. In the case of LTE and LTE-Advanced, for example, the digital baseband signal processing performed by the processor 1204 may include signal processing of the PDCP layer, RLC layer, MAC layer, and PHY layer. Further, the control-plane processing performed by the processor 1204 may include the processing of the S1 protocol, RRC protocol, and MAC CEs.

The processor 1204 may include a plurality of processors. The baseband processor 1204 may include a modem processor (e.g., DSP) that performs the digital baseband signal processing and a protocol stack processor (e.g., CPU or MPU) that performs the control-plane processing.

The memory 1205 is composed of a combination of a volatile memory and a non-volatile memory. The volatile memory is, for example, an SRAM, a DRAM, or a combination thereof. The non-volatile memory may be a MROM, a PROM, a flash memory, a hard disk drive, or a combination thereof. The memory 1205 may include a storage disposed separately from the processor 1204. In this case, the processor 1204 may access the memory 1205 via the network interface 1203 or an I/O interface not shown.

The memory 1205 may store one or more software modules (computer programs) 1206 including instructions and data for processing by the node in the RAN 2 (e.g., CIoT BS, eNB) described in the above embodiments. In some implementations, the processor 1204 may load these one or more software modules from the memory 1205 and execute the loaded software modules, thereby performing the processing of the node in the RAN 2 described in the above embodiments.

Figure 13:
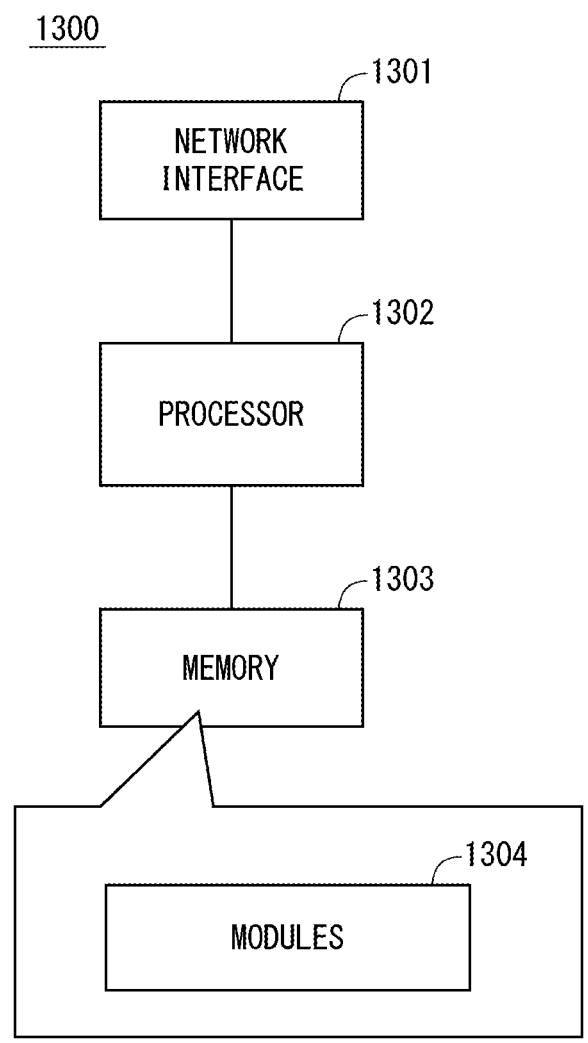
FIG. 13 is a block diagram showing a configuration example of a core network node according to some embodiments.

FIG. 13 is a block diagram showing a configuration example of a node (e.g., C-SGN, MME) in the CN 3 according to the above embodiments. Referring to FIG. 13, the node includes a network interface 1301, a processor 1302, and a memory 1303. The network interface 1301 is used to communicate with network nodes (e.g., C-SGN, MME, HSS, S-GW, P-GW, CIoT BS, eNB). The network interface 1301 may include, for example, a network interface card (NIC) conforming to the IEEE 802.3 series.

The processor 1302 loads one or more software modules (computer programs) from the memory 1303 and executes the loaded software modules, thereby performing the processing of the node in the CN 3 (e.g., C-SGN, MME) described in the above embodiments. The processor 1302 may be, for example, a microprocessor, MPU, or CPU. The processor 1302 may include a plurality of processors.

The memory 1303 is composed of a combination of a volatile memory and a non-volatile memory. The memory 1303 may include a storage disposed separately from the processor 1302. In this case, the processor 1302 may access the memory 1303 via an I/O interface (not shown).

As described with reference to FIGS. 11 and 13, each of the processors included in the UE 1, the node in the RAN 2, and the node in the CN 3 according to the above-described embodiments executes one or more programs including instructions to cause a computer to perform the algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory (RAM)). These programs may be provided to a computer using any type of transitory computer readable media. Examples of transitory computer readable media include electric signals, optical signals, and electromagnetic waves. Transitory computer readable media can be used to provide programs to a computer via a wired communication line (e.g., electric wires, and optical fibers) or a wireless communication line.

Other Embodiments

Each of the above embodiments may be used individually, or two or more of the embodiments may be appropriately combined with one another.

In the above embodiments, when the UE 1 changes the serving cell from the cell in which the RRC connection has been suspended to another cell (e.g., cell reselection, attach after detach), it may be preferable that the UE 1 can know whether the functions described in the above embodiment are available in the serving cell after the change of cell. Thus, the RAN 2 may broadcast an information element indicating whether the functions are supported in the serving cell. For example, the RAN 2 (e.g., eNB, CIoT-BS) may broadcast this information element in respective cells in the RAN 2. The information element may indicate whether the cell in which this information element is broadcasted supports the functions. Furthermore, the information element may indicate whether an adjacent cell supports the functions.

The RAN 2 described in the above embodiments may be a Cloud Radio Access Network (C-RAN). The C-RAN is also referred to as a Centralized RAN. Specifically, the processes and operations performed by the RAN 2, or the CIoT BS or the eNB in the RAN 2, described in the above embodiments may be provided by one or a combination of a Digital Unit (DU) and a Radio Unit (RU) included in the C-RAN architecture. The DU is also referred to as a Baseband Unit (BBU). The RU is also referred to as a Remote Radio Head (RRH) or Remote Radio Equipment (RRE). That is, the processes and operations performed by the RAN 2, the CIoT BS, or the eNB described in the above embodiments may be provided by any one or more radio stations (i.e., RAN nodes).

The above-described embodiments are merely examples of applications of the technical ideas obtained by the inventors. These technical ideas are not limited to the above-described embodiments, and various changes and modifications may be thereto.

For example, the whole or part of the embodiments disclosed above can be described as, but not limited to, the following supplementary notes.

(Supplementary Note A1)

A radio terminal comprising:

a memory; and at least one processor coupled to the memory, wherein the at least one processor is configured to support a plurality of communication architecture types, the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio terminal a context of a previous RRC connection while the radio terminal is in an RRC idle state, the resumption of the RRC connection includes reusing the retained context at the time of a setup of a subsequent RRC connection in order for the radio terminal to transition from the RRC idle state to an RRC connected state, and the at least one processor is further configured to, in response to an occurrence of a request for specific data transmission when the radio terminal has already been configured by a network to use the second communication architecture type, transmit data using the first communication architecture type.

(Supplementary Note A2)

The radio terminal according to Supplementary note A1, wherein the specific data transmission includes non-Internet Protocol (non-IP) data transmission.

(Supplementary Note A3)

The radio terminal according to Supplementary note A1 or A2, wherein the specific data transmission includes Short Message Service (SMS) data transmission.

(Supplementary Note A4)

The radio terminal according to any one of Supplementary notes A1 to A3, wherein the specific data transmission includes data transmission of only one packet.

(Supplementary Note A5)

The radio terminal according to any one of Supplementary notes A1 to A4, wherein the specific data transmission includes data transmission related to a predetermined service.

(Supplementary Note A6)

The radio terminal according to any one of Supplementary notes A1 to A5, wherein the radio terminal is adapted to be configured by the network to use both the first and second communication architecture types, and the at least one processor is configured to determine which of the first and second communication architecture types is to be used, depending on whether requested communication is the specific data transmission.

(Supplementary Note A7)

The radio terminal according to any one of Supplementary notes A1 to A5, wherein the radio terminal is adapted to be configured by the network to use either of the first and second communication architecture types and not to simultaneously use both the first and second communication architecture types, and the at least one processor is configured to switch from the second communication architecture type to the first communication architecture type in response to the occurrence of the request for the specific data transmission.

(Supplementary Note A8)

A method in a radio terminal, the method comprising:

being configured by a network with at least one of a plurality of communication architecture types, wherein the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio terminal a context of a previous RRC connection while the radio terminal is in an RRC idle state, the resumption of the RRC connection includes reusing the retained context at the time of a setup of a subsequent RRC connection in order for the radio terminal to transition from the RRC idle state to an RRC connected state, and the method further comprises, in response to an occurrence of a request for specific data transmission when the radio terminal has already been configured by the network to use the second communication architecture type, transmitting data using the first communication architecture type.

(Supplementary Note B1)

A radio terminal comprising:

a memory; and at least one processor coupled to the memory, wherein the at least one processor is configured to support a plurality of communication architecture types, the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio terminal a context of a previous RRC connection while the radio terminal is in an RRC idle state, the resumption of the RRC connection includes reusing the retained context at the time of a setup of a subsequent RRC connection in order for the radio terminal to transition from the RRC idle state to an RRC connected state, and the at least one processor is further configured to, in response to an occurrence of a request for data transmission in accordance with the first communication architecture type while the radio terminal is executing the suspension for the second communication architecture type, initiate communication in accordance with the first communication architecture type while retaining the context.

(Supplementary Note B2)

The radio terminal according to Supplementary note B 1, wherein the at least one processor is configured to transmit a Non-Access Stratum (NAS) message containing data of the first communication architecture type using an RRC message that is used for the resumption of the RRC connection, and the RRC message includes an indication indicating data transmission over a Non-Access Stratum (NAS).

(Supplementary Note B3)

The radio terminal according to Supplementary note B1 or B2, wherein the at least one processor is configured to transmit the Non-Access Stratum (NAS) message containing the data of the first communication architecture type using an RRC message that is used for the resumption of the RRC connection, and the NAS message includes an indication indicating the data transmission over the Non-Access Stratum (NAS).

(Supplementary Note B4)

A method in a radio terminal, the method comprising:

being configured by a network with at least one of a plurality of communication architecture types, wherein the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio terminal a context of a previous RRC connection while the radio terminal is in an RRC idle state, the resumption of the RRC connection includes reusing the retained context at the time of a setup of a subsequent RRC connection in order for the radio terminal to transition from the RRC idle state to an RRC connected state, and the method further comprises, in response to an occurrence of a request for data transmission in accordance with the first communication architecture type while the radio terminal is executing the suspension for the second communication architecture type, initiating communication in accordance with the first communication architecture type while retaining the context.

(Supplementary Note C1)

A radio terminal comprising:

a memory; and at least one processor coupled to the memory, wherein the at least one processor is configured to support a plurality of communication architecture types, the plurality of communication architecture types include (a) a first communication architecture type in which a data packet is transmitted via a control plane and (b) a second communication architecture type in which a data packet is transmitted via a user plane and that involves suspension and resumption of a Radio Resource Control (RRC) connection, the suspension of the RRC connection includes retaining in the radio terminal a context of a previous RRC connection while the radio terminal is in an RRC idle state, the resumption of the RRC connection includes reusing the retained context at the time of a setup of a subsequent RRC connection in order for the radio terminal to transition from the RRC idle state to an RRC connected state, and the at least one processor is further configured to, in response to an occurrence of a request for data transmission in accordance with the first communication architecture type while the radio terminal is executing the suspension for the second communication architecture type, discard or release the context and initiate communication in accordance with the first communication architecture type.

(Supplementary Note C2)

The radio terminal according to Supplementary note C1, wherein the at least one processor is configured to transmit an indication indicating discarding of the context to a network during a control procedure for initiating the communication in accordance with the first communication architecture type.

(Supplementary Note C3)

The radio terminal according to Supplementary note C2, wherein the at least one processor is configured to include the indication in either or both of an RRC message and a Non-Access Stratum (NAS) message to be transmitted in the control procedure.

(Supplementary Note C4)

A radio station in a radio access network, the radio station comprising:

a memory; and at least one processor coupled to the memory, wherein the at least one processor is configured to support a plurality of communication architecture types, the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio station a first context regarding a previous RRC connection while a radio terminal is in an RRC idle state, the resumption of the RRC connection includes reusing the retained first context at the time of a setup of a subsequent RRC connection in order for the radio terminal to transition from the RRC idle state to an RRC connected state, and the at least one processor is further configured to recognize that the first context is allowed to be discarded or released, in response to receiving an RRC message for data transmission in accordance with the first communication architecture type while the radio station is executing the suspension for the radio terminal.

(Supplementary Note C5)

The radio station according to Supplementary note C4, wherein the RRC message includes an indication indicating discarding or releasing of a second context retained in the radio terminal for the suspension, and the at least one processor is configured to, in response to receiving the indication, recognize that the first context is allowed to be discarded or released.

(Supplementary Note C6)

A network apparatus in a core network comprising:

a memory; and at least one processor coupled to the memory, wherein the at least one processor is configured to support a plurality of communication architecture types, the plurality of communication architecture type include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining, in the network apparatus, a signaling association for a radio terminal between the network apparatus and a radio station and a bearer context for the radio terminal, while the radio terminal is in an RRC idle state, the resumption of the RRC connection includes reusing or restoring the retained signaling association and the bearer context along with a setup of a subsequent RRC connection in order for the radio terminal to transition from the RRC idle state to an RRC connected state, and the at least one processor is further configured to recognize that the retained signaling association and the retained bearer context are allowed to be discarded or released, in response to receiving, from the radio terminal or the radio station, a control message for data transmission in accordance with the first communication architecture type while the network apparatus is executing the suspension for the radio terminal.

(Supplementary Note C7)

The radio station according to Supplementary note C6, wherein the control message includes an indication indicating discarding or releasing of the second context regarding the RRC connection retained in the radio terminal for the suspension, and the at least one processor is configured to, in response to receiving the indication, recognize that the signaling association and the bearer context are allowed to be discarded or released.

(Supplementary Note C8)

The network apparatus according to Supplementary note C6 or C7 wherein the control message includes a Non-Access Stratum (NAS) message, or an S1 Application Protocol (S1AP) message, or both.

(Supplementary Note C9)

A method in a radio terminal, the method comprising:

being configured by a network with at least one of a plurality of communication architecture types, wherein the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio terminal a context of a previous RRC connection while the radio terminal is in an RRC idle state, the resumption of the RRC connection includes reusing the retained context at the time of a setup of a subsequent RRC connection in order for the radio terminal to transition from the RRC idle state to an RRC connected state, and the method further comprises, in response to an occurrence of a request for data transmission in accordance with the first communication architecture type while the radio terminal is executing the suspension for the second communication architecture type, discarding or releasing the context and initiating communication in accordance with the first communication architecture type.

(Supplementary Note C10)

A method in a radio station in a radio access network, the method comprising:

supporting a plurality of communication architecture types, wherein the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio station a first context regarding a previous RRC connection while a radio terminal is in an RRC idle state, the resumption of the RRC connection includes reusing the retained first context at the time of a setup of a subsequent RRC connection in order for the radio terminal to transition from the RRC idle state to an RRC connected state, and the method further comprises recognizing that the first context is allowed to be discarded or released, in response to receiving an RRC message for data transmission in accordance with the first communication architecture type while the radio station is executing the suspension for the radio terminal.

(Supplementary Note C11)

A method in a network apparatus in a core network, the method comprising:

supporting a plurality of communication architecture types, wherein the plurality of communication architecture type include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining, in the network apparatus, a signaling association for a radio terminal between the network apparatus and a radio station and a bearer context for the radio terminal, while the radio terminal is in an RRC idle state, the resumption of the RRC connection includes reusing or restoring the retained signaling association and the bearer context along with a setup of a subsequent RRC connection in order for the radio terminal to transition from the RRC idle state to an RRC connected state, and the method further comprises recognizing that the retained signaling association and the retained bearer context are allowed to be discarded or released, in response to receiving, from the radio terminal or the radio station, a control message for data transmission in accordance with the first communication architecture type while the network apparatus is executing the suspension for the radio terminal.

(Supplementary Note D1)

A radio terminal comprising:

a memory; and at least one processor coupled to the memory, wherein the at least one processor is configured to support a plurality of communication architecture types, the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio terminal a context of a previous RRC connection while the radio terminal is in an RRC idle state, the resumption of the RRC connection includes reusing the retained context at the time of a setup of a subsequent RRC connection in order for the radio terminal to transition from the RRC idle state to an RRC connected state, the at least one processor is further configured to, in response to an occurrence of a request for specific data transmission in accordance with the first communication architecture type while the radio terminal is executing the suspension for the second communication architecture type, transmit an RRC connection resume message used for the resumption of the RRC connection, and the RRC connection resume message indicates an establishment cause associated with data transmission over a Non-Access Stratum (NAS).

(Supplementary Note D2)

The radio terminal according to Supplementary note D1, wherein the specific data transmission is non-Internet Protocol (non-IP) data transmission or Short Message Service (SMS) transmission, the at least one processor is configured to operate as an NAS layer that provides mobility management and session management and as an Access Stratum (AS) layer that provides radio resource control, and the NAS layer is configured to, in response to the occurrence of the request for the specific data transmission while the radio terminal is executing the suspension for the second communication architecture type, generate a NAS message carrying data and provided a request for RRC connection establishment to the AS layer, the request for RRC connection establishment containing the establishment cause associated with the data transmission over the NAS and a call type associated with the specific transmission.

(Supplementary Note D3)

A radio station in a radio access network comprising:
a memory; and
at least one processor coupled to the memory, wherein the at least one processor is configured to support a plurality of communication architecture types,
the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection,
the suspension of the RRC connection includes retaining in the radio station a context regarding a previous RRC connection while a radio terminal is in an RRC idle state,
the resumption of the RRC connection includes reusing the retained context at the time of a setup of a subsequent RRC connection in order for the radio terminal to transition from the RRC idle state to an RRC connected state,
the at least one processor is further configured to receive an RRC connection resume message used for the resumption of the RRC connection while the radio station is executing the suspension for the radio terminal, and
the at least one processor is further configured to, in response to the RRC connection resume message indicating an establishment cause associated with data transmission over a Non-Access Stratum (NAS), recognize that communication is in accordance with the first communication architecture type.

(Supplementary Note D4)

The radio station according to Supplementary note D3, wherein
the suspension of the RRC connection further includes retaining in the radio station and a core network a bearer context regarding a bearer for the radio terminal between the radio station and the core network while the radio terminal is in the RRC idle state,
the resumption of the RRC connection further includes restoring or reusing the bearer based on the bearer context along with the setup of the subsequent RRC connection, and
the at least one processor is configured to prevent itself from requesting the core network to restore or reuse the bearer, when the RRC connection resume message indicates the establishment cause associated with the data transmission over the Non-Access Stratum (NAS).

(Supplementary Note D5)

A method in a radio terminal, the method comprising:
being configured by a network with at least one of a plurality of communication architecture types, wherein
the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection,
the suspension of the RRC connection includes retaining in the radio terminal a context of a previous RRC connection while the radio terminal is in an RRC idle state,
the resumption of the RRC connection includes reusing the retained context at the time of a setup of a subsequent RRC connection in order for the radio terminal to transition from the RRC idle state to an RRC connected state,
the method further comprises, in response to an occurrence of a request for specific data transmission in accordance with the first communication architecture type while the radio terminal is executing the suspension for the second communication architecture type, transmitting an RRC connection resume message used for the resumption of the RRC connection, and
the RRC connection resume message indicates an establishment cause associated with data transmission over a Non-Access Stratum (NAS).

(Supplementary Note D6)

A method in a radio station in a radio access network, the method comprising:
supporting a plurality of communication architecture types, wherein
the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection,
the suspension of the RRC connection includes retaining in the radio station a context regarding a previous RRC connection while a radio terminal is in an RRC idle state,
the resumption of the RRC connection includes reusing the retained context at the time of a setup of a subsequent RRC connection in order for the radio terminal to transition from the RRC idle state to an RRC connected state,
the at least one processor is further configured to receive an RRC connection resume message used for the resumption of the RRC connection while the radio station is executing the suspension for the radio terminal, and
the method further comprises, in response to the RRC connection resume message indicating an establishment cause associated with data transmission over a Non-Access Stratum (NAS), recognizing that communication is in accordance with the first communication architecture type.

The present application is based upon and claims the benefit of priority from Japanese Patent Application No. 2016-020291, filed on Feb. 4, 2016, the entire contents of which are hereby incorporated by reference.

REFERENCE SIGNS LIST

1 User Equipment (UE)
2 Radio Access Network (RAN)
3 Core Network (CN)
4 APPLICATION SERVER
6 Serving Gateway (S-GW)/Packet Data Network Gateway (P-GW)
1103 BASEBAND PROCESSOR
1104 APPLICATION PROCESSOR
1106 MEMORY
1204 PROCESSOR
1205 MEMORY
1302 PROCESSOR
1303 MEMORY

The invention claimed is:
1. A radio terminal comprising:
a memory; and
at least one processor coupled to the memory, wherein the at least one processor is configured to support a plurality of communication architecture types, the plurality of communication architecture types include:
(a) a first communication architecture type in which a data packet is transmitted via a control plane and (b) a second communication architecture type in which a data packet is transmitted via a user plane and that involves suspension and resumption of a Radio Resource Control (RRC) connection, the suspension of the RRC connection includes retaining in the radio terminal a context of a previous RRC connection while the radio terminal is in an RRC idle state, the resumption of the RRC connection includes reusing the retained context at the time of a setup of a subsequent RRC connection in order for the radio terminal to transition from the RRC idle state to an RRC connected state, the at least one processor is further configured to, in response to an occurrence of a request for specific data transmission when the radio terminal has already been configured by a network to use the second communication architecture type, transmit data using the first communication architecture type, and the at least one processor is configured to, when the radio terminal has been configured by the network to use both the first and second communication architecture types, determine which of the first and second communication architecture types is to be used, depending on whether requested communication is the specific data transmission.

2. The radio terminal according to claim 1, wherein the specific data transmission includes non-Internet Protocol (non-IP) data transmission.

3. The radio terminal according to claim 1, wherein the specific data transmission includes Short Message Service (SMS) data transmission.

4. The radio terminal according to claim 1, wherein the specific data transmission includes data transmission of only one packet.

5. The radio terminal according to claim 1, wherein the specific data transmission includes data transmission related to a predetermined service.

6. The radio terminal according to claim 1, wherein
the radio terminal is adapted to be configured by the network to use either of the first and second communication architecture types and not to simultaneously use both the first and second communication architecture types, and the at least one processor is configured to switch from the second communication architecture type to the first communication architecture type in response to the occurrence of the request for the specific data transmission.

7. The radio terminal according to claim 1, wherein the at least one processor is further configured to, in response to an occurrence of a request for data transmission in accordance with the first communication architecture type while the radio terminal is executing the suspension for the second communication architecture type, initiate communication in accordance with the first communication architecture type while retaining the context.

8. The radio terminal according to claim 7, wherein
the at least one processor is configured to transmit a Non-Access Stratum (NAS) message containing data of the first communication architecture type using an RRC message that is used for the resumption of the RRC connection, and the RRC message includes an indication indicating data transmission over a Non-Access Stratum (NAS).

9. The radio terminal according to claim 7, wherein
the at least one processor is configured to transmit the Non-Access Stratum (NAS) message containing the data of the first communication architecture type using an RRC message that is used for the resumption of the RRC connection, and the NAS message includes an indication indicating the data transmission over a Non-Access Stratum (NAS).

10. The radio terminal according to claim 1, wherein the at least one processor is further configured to, in response to an occurrence of a request for data transmission in accordance with the first communication architecture type while the radio terminal is executing the suspension for the second communication architecture type, discard or release the context and initiate communication in accordance with the first communication architecture type.

11. The radio terminal according to claim 10, wherein the at least one processor is configured to transmit an indication indicating discarding of the context to the network during a control procedure for initiating the communication in accordance with the first communication architecture type.

12. The radio terminal according to claim 11, wherein the at least one processor is configured to include the indication in either or both of an RRC message and a Non-Access Stratum (NAS) message to be transmitted in the control procedure.

13. The radio terminal according to claim 1, wherein
the at least one processor is further configured to, in response to an occurrence of a request for specific data transmission in accordance with the first communication architecture type while the radio terminal is executing the suspension for the second communication architecture type, transmit an RRC connection resume message used for the resumption of the RRC connection, and the RRC connection resume message indicates an establishment cause associated with data transmission over a Non-Access Stratum (NAS).

14. The radio terminal according to claim 13, wherein
the specific data transmission is non-Internet Protocol (non-IP) data transmission or Short Message Service (SMS) transmission, the at least one processor is configured to operate as an NAS layer that provides mobility management and session management and as an Access Stratum (AS) layer that provides radio resource control, and the NAS layer is configured to, in response to the occurrence of the request for the specific data transmission while the radio terminal is executing the suspension for the second communication architecture type, generate a NAS message carrying data and provides a request for RRC connection establishment to the AS layer, the request for RRC connection establishment containing the establishment cause associated with the data transmission over the NAS and a call type associated with the specific transmission.

15. A radio station used in a radio access network, the radio station comprising:
a memory; and
at least one processor coupled to the memory, wherein
the at least one processor is configured to support a plurality of communication architecture types,
the plurality of communication architecture types include:
(a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio station a context regarding a previous RRC connection while a radio terminal is in an RRC idle state, the resumption of the RRC connection includes reusing the retained context at the time of a setup of a subsequent RRC connection in order for the radio terminal to transition from the RRC idle state to an RRC connected state, the at least one processor is further configured to receive an RRC connection resume message used for the resumption of the RRC connection while the radio station is executing the suspension for the radio terminal, and the at least one processor is further configured to, in response to the RRC connection resume message indicating an establishment cause associated with data transmission over a Non-Access Stratum (NAS), recognize that communication is in accordance with the first communication architecture type.

16. The radio station according to claim 15, wherein the suspension of the RRC connection further includes retaining in the radio station and a core network a bearer context regarding a bearer for the radio terminal between the radio station and the core network while the radio terminal is in the RRC idle state, the resumption of the RRC connection further includes restoring or reusing the bearer based on the bearer context along with the setup of the subsequent RRC connection, and the at least one processor is configured to prevent itself from requesting the core network to restore or reuse the bearer, when the RRC connection resume message indicates the establishment cause associated with the data transmission over the Non-Access Stratum (NAS).

17. A method in a radio terminal, the method comprising:

being configured by a network with at least one of a plurality of communication architecture types, wherein the plurality of communication architecture types include: (a) a first communication architecture type in which a data packet is transmitted via a control plane; and (b) a second communication architecture type in which a data packet is transmitted via a user plane and that involves suspension and resumption of a Radio Resource Control (RRC) connection, the suspension of the RRC connection includes retaining in the radio terminal a context of a previous RRC connection while the radio terminal is in an RRC idle state, the resumption of the RRC connection includes reusing the retained context at the time of a setup of a subsequent RRC connection in order for the radio terminal to transition from the RRC idle state to an RRC connected state, the method further comprises, in response to an occurrence of a request for specific data transmission when the radio terminal has already been configured by the network to use the second communication architecture type, transmitting data using the first communication architecture type, and the method further comprises, when the radio terminal has been configured by the network to use both the first and second communication architecture types, determining which of the first and second communication architecture types is to be used, depending on whether requested communication is the specific data transmission.

* * * * *

UNITED STATES PATENT AND TRADEMARK OFFICE
CERTIFICATE OF CORRECTION

PATENT NO. : 10,506,389 B2
APPLICATION NO. : 16/069777
DATED : December 10, 2019
INVENTOR(S) : Hisashi Futaki and Sadafuku Hayashi Page 1 of 1

It is certified that error appears in the above-identified patent and that said Letters Patent is hereby corrected as shown below:

In the Specification

Column 2, Line 2; Delete "SLAP" and insert --S1AP-- therefor

Column 9, Line 30; Delete "SLAP" and insert --S1AP-- therefor

Signed and Sealed this
Twenty-fourth Day of November, 2020

Andrei Iancu
*Director of the United States Patent and Trademark Office*